(12) United States Patent
Ishimi et al.

(10) Patent No.: US 7,646,692 B2
(45) Date of Patent: Jan. 12, 2010

(54) APPARATUS FOR RECORDING DYE BASED RECORDABLE DVD MEDIA AND PROCESS FOR RECORDING THE SAME

(75) Inventors: Tomomi Ishimi, Yokohama (JP); Tatsuya Tomura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 822 days.

(21) Appl. No.: 11/074,070

(22) Filed: Mar. 8, 2005

(65) Prior Publication Data

US 2005/0201243 A1    Sep. 15, 2005

(30) Foreign Application Priority Data

| Mar. 10, 2004 | (JP) | ............................. 2004-067996 |
| Sep. 17, 2004 | (JP) | ............................. 2004-272347 |
| Sep. 17, 2004 | (JP) | ............................. 2004-272364 |
| Nov. 5, 2004 | (JP) | ............................. 2004-322428 |
| Nov. 9, 2004 | (JP) | ............................. 2004-325365 |
| Dec. 1, 2004 | (JP) | ............................. 2004-348376 |

(51) Int. Cl.
*G11B 5/09* (2006.01)

(52) U.S. Cl. .................. 369/59.11; 369/47.5; 369/116; 369/94; 369/284; 369/286

(58) Field of Classification Search .............. 369/59.12, 369/94, 288, 292, 59.11, FOR. 118; 430/270.13
See application file for complete search history.

(56) References Cited

U.S. PATENT DOCUMENTS 5,783,320 A * 7/1998 Shimazaki et al. ....... 428/820.6
6,628,595 B1 9/2003 Sasa et al.
6,704,269 B1 3/2004 Ogawa
6,996,047 B2 * 2/2006 Nagano .................... 369/59.11
2002/0067670 A1 6/2002 Akiyama et al.
2002/0085463 A1 7/2002 Minemura et al.

(Continued)

FOREIGN PATENT DOCUMENTS

EP          1 347 444 A2      9/2003

(Continued)

*Primary Examiner*—Wayne R Young
*Assistant Examiner*—Dionne H Pendleton
(74) *Attorney, Agent, or Firm*—Dickstein Shapiro LLP

(57) ABSTRACT

The present invention relates to apparatuses and processes for recording dye-based recordable DVD media in higher quality at higher linear recording velocity, and provides an apparatus for recording a dye-based recordable DVD medium comprising a shortest mark recording unit, a second mark recording unit, and a cooling pulse irradiating unit, wherein the dye-based recordable DVD medium comprises a substrate and a recording layer formed on the substrate, the substrate comprises a guide groove to which wobble is formed, and the recording layer comprises at least an organic dye, the shortest mark recording unit is configured to record each of the shortest marks by use of one pulse beam of which the rear edge is more energized than the front edge, the second mark recording unit is configured to record each of the marks other than the shortest marks by use of one pulse beam of which the two sites of front and rear edges are energized, the cooling pulse irradiating unit is configured to irradiate cooling pulse laser beams onto the backwards of the respective pulse beams at 0.1 mW/pulse or less of optical energy, and the recording of marks is performed on the recording layer at a recording linear velocity of 42 m/sec or more.

22 Claims, 12 Drawing Sheets

U.S. PATENT DOCUMENTS

| | | |
|---|---|---|
| 2003/0031108 A1* | 2/2003 | Furumiya et al. ......... 369/59.12 |
| 2003/0067857 A1 | 4/2003 | Shirota et al. |
| 2003/0090981 A1 | 5/2003 | Yokoi |
| 2004/0022173 A1* | 2/2004 | Kondo et al. ................ 369/292 |
| 2004/0027959 A1 | 2/2004 | Sasa et al. |
| 2004/0090885 A1* | 5/2004 | Nishiuchi et al. ......... 369/44.29 |
| 2004/0130998 A1* | 7/2004 | Iwasa et al. ................... 369/94 |
| 2004/0265645 A1 | 12/2004 | Noguchi et al. |
| 2008/0186826 A1* | 8/2008 | Matsumoto ................... 369/94 |
| 2008/0198733 A1* | 8/2008 | Nagai ...................... 369/275.3 |

FOREIGN PATENT DOCUMENTS

| | | |
|---|---|---|
| EP | 1 361 570 A2 | 11/2003 |
| JP | 05151638 A * | 6/1993 |
| JP | 8-295079 | 11/1996 |
| JP | 9-309268 | 12/1997 |
| JP | 10-162430 | 6/1998 |
| JP | 11-34499 | 2/1999 |
| JP | A 2001-176073 | 6/2001 |
| JP | A 2003-085753 | 3/2003 |
| JP | 2003-248926 | 9/2003 |
| JP | 2004-195765 | 7/2004 |

* cited by examiner

APPARATUS FOR RECORDING DYE BASED RECORDABLE DVD MEDIA AND PROCESS FOR RECORDING THE SAME

BACKGROUND OF THE INVENTION

1. Field of the Invention

The present invention relates to apparatuses and processes for recording dye-based recordable DVD media, wherein the recording layers of the DVD media cause changes in optical properties such as transmittance and reflectance through irradiating optical or laser beams, thereby enabling recording and reproducing information.

2. Description of the Related Art

Recently, recordable digital versatile discs (DVD-R) have been developed for providing advanced large capacity optical discs. In order to enhance recording capacity of optical discs, recording materials have been improved to micronize recording pits, image compression formats such as MPEG2 have been developed, and semiconductor lasers have been improved to shorten the wavelength for reading recording pits.

Conventionally, as for recording and reproducing semiconductor lasers at red wavelength regions, only AlGaInP laser diodes have been commercially utilized at 670 nm, for example, for barcode readers or instrumentation units. Nowadays, red lasers are remarkably expanding their markets in terms of optical storage products along with optical discs being highly densified. DVD drives are standardized at two wavelengths of 635 nm and 650 nm using laser diodes, and DVD-ROM drives of wavelength 650 nm are commercially available.

Typically, in dye-based recordable DVD media where pits or marks are formed by use of heat mode, the pulse width and the recording power of laser pulse are optimized at a specific recording rate, thus there exist a problem that the marks and/or spaces are different at the other recording rates. Namely, dye-based recordable DVD media suffer from problems that mark widths are hardly uniform, mark lengths are often elongated or shortened, and jitter properties tend to degrade with time, since thermal capacity from heat pulses turns into insufficient that is required to form marks at edges, and the heating temperatures are different from the optimal decomposing temperature, therefore, the average length of marks tends to fluctuate and the duty ratio of optimal heating pulse comes to different.

In addition, as for physical formats of DVD media, the format of DVD-R media is standardized through partially cutting the land portions of so-called land pre-pits. According to the format, there are problems that pre-pit information such as pre-pit addresses cannot be properly reproduced when the land pre-pit signal is less than 0.16; on the other hand, the land-pit signals themselves act noisily when the land pre-pit signal is more than 0.32 at data region, thus resulting in frequent occurrences of data errors. Accordingly, in order to utilize land pre-pit signals, there arises a disadvantage that cut width should be adjusted with respect to the recording material by a stamper, which is a mold to transfer a signal recording portion of original pattern to resin substrates and is utilized at an injection molding cavity, and the land cut width should be adjusted so as to control the land pre-pit signal into the range of 0.16 to 0.32.

In the prior art concerning the recordable DVD media that employ a dye in the recording layer, Japanese Patent Application Laid-Open (JP-A) No. 2004-195764 discloses employment of polymethine dyes or combination of polymethine dyes and optical stabilizers as recording material; JP-A Nos. 09-309268 and 11-34499 disclose employment of a layer formed from tetraazaporphyrin (porphyrazin) dye or combination of cyanine dyes and azometalchelate dyes (salt forming dye) and a reflective layer as a recording layer;

JP-A No. 08-295079 discloses employment of formazane (metal chelate) dye and the other dyes as the recording material; and JP-A No. 10-162430 discloses employment of dipyromethene (metal chelate) dye and the other dyes as the recording material; and further, many proposals appear that perform multi-pulse recording by means of dyes as the recording materials. In addition, such recording is also demanded that performs one pulse recording on dye-based recordable DVD media while optimizing the recording waveform to perform recording at higher linear velocity.

SUMMARY OF THE INVENTION

The apparatuses and processes for recording dye-based recordable DVD media according to the present invention provide new formats with recordable DVD systems that utilize semiconductor lasers having shorter oscillating wavelength compared to CD media, which feature may represent an effective way to eliminate unrecorded regions at additional data portions similarly to LPP system, and also may present an advantage that data errors are hardly induced due to precise control of fine cut width at preparing stampers and/or LPP signal leaks into data portion, accordingly the apparatuses and processes according to the present invention may satisfactorily applied to dye-based recordable DVD recording media and the like.

The apparatus for recording a dye-based recordable DVD medium according to the present invention comprises a shortest mark recording unit, a second mark recording unit, and a cooling pulse irradiating unit, wherein the dye-based recordable DVD medium comprises a substrate and a recording layer formed on the substrate, the substrate comprises a guide groove to which wobble is formed, and the recording layer comprises at least an organic dye, the shortest mark recording unit is configured to record each of the shortest marks by use of one pulse beam of which the rear edge is more energized than the front edge, the second mark recording unit is configured to record each of the marks other than the shortest marks by use of one pulse beam of which the two sites of front and rear edges are energized, the cooling pulse irradiating unit is configured to irradiate cooling pulse laser beams onto the backwards of the respective pulse beams at 0.1 mW/pulse or less of optical energy.

Consequently, unrecorded regions may be reduced at additionally recording portions under a recording linear velocity of as high as 42 meters per second (hereinafter, expressed simply as "m/sec") or more, and also occurrences of data errors may be effectively prevented.

The process for recording a dye-based recordable DVD medium according to the present invention comprises recording shortest marks, recording second marks, and irradiating cooling pulses, wherein the dye-based recordable DVD medium comprises a substrate and a recording layer formed on the substrate, the substrate comprises a guide groove to which wobble is formed, and the recording layer comprises at least an organic dye, the recording shortest marks performs to record each of the shortest marks by use of one pulse beam of which the rear edge is more energized than the front edge, the recording second marks performs to record each of the marks other than the shortest marks by use of one pulse beam of which the two sites of front and rear edges are energized, the irradiating cooling pulses performs to irradiate cooling pulse laser beams onto the backwards of the respective pulse beams at 0.1 mW/pulse or less of optical energy.

Consequently, recordings may be performed to dye-based recordable DVD media while effectively preventing occurrences of data errors under a recording linear velocity of as high as 42 m/sec or more.

The apparatus for regenerating a dye-based recordable DVD medium according to the present invention comprises an input device, control device, display device, interface, optical disc drive, information recording device, and the like, and is equipped with an operating system by which all of the devices in the apparatus are controlled. Accordingly, the dye-based recordable DVD medium recorded by the apparatus and/or process according to the present invention may be successfully regenerated.

The dye-based recordable DVD medium according to the present invention is prepared by use of the apparatus and/or process according to the present invention, and may provide features that unrecorded regions are little at additionally recording portions and the recordings are of high quality without occurrences of data errors under a recording linear velocity of as high as 42 m/sec or more.

DESCRIPTION OF THE PREFERRED EMBODIMENTS

Figure 1A:
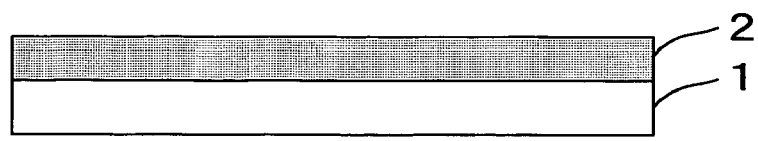
FIG. 1A exemplarily shows a layer construction of a conventional recordable DVD medium.
Figure 1B:
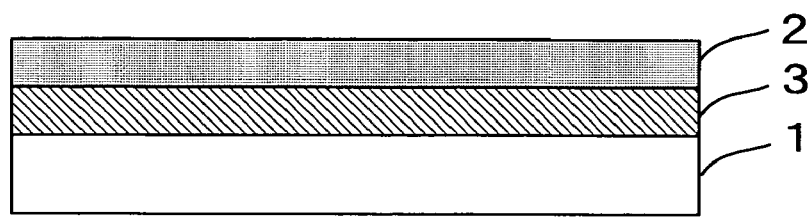
FIG. 1B exemplarily shows another layer construction of a conventional recordable DVD medium.
Figure 1C:
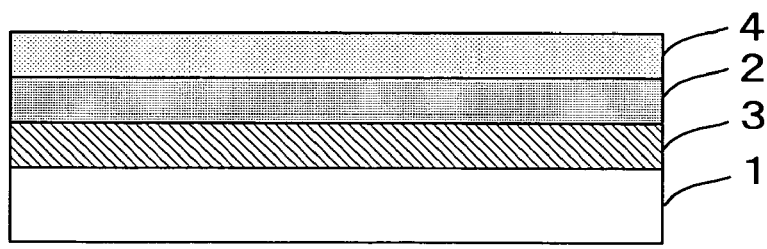
FIG. 1C exemplarily shows still another layer construction of a conventional recordable DVD medium.
Figure 1D:
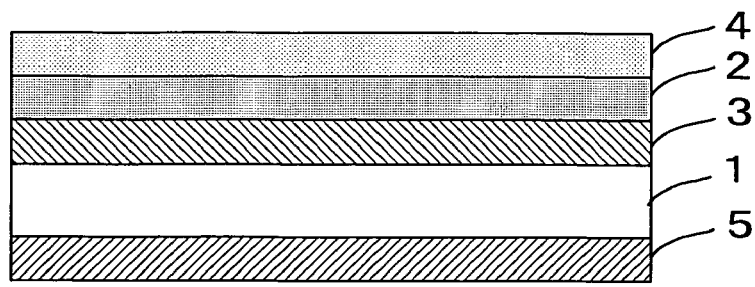
FIG. 1D exemplarily shows still another layer construction of a conventional recordable DVD medium.

The apparatuses for recording dye-based recordable DVD media according to the present invention are appropriately represented by the following first to fourth aspects. The apparatuses for recording dye-based recordable DVD media in the following first to fourth aspects are able to record in a recording layer formed on a substrate at a recording linear velocity of 42 m/sec or more by means of a unit configured to record shortest marks, a unit configured to record second marks, a unit configured to irradiate cooling pulses, and the other units selected properly depending on requirements.

The processes for recording dye-based recordable DVD media according to the present invention are able to record in a recording layer formed on a substrate at a recording linear velocity of 42 m/sec or more by means of recording shortest marks, recording marks, irradiating cooling pulses, and the others selected properly depending on requirements.

The processes for recording dye-based recordable DVD media according to the present invention can be properly performed by the apparatuses for recording dye-based recordable DVD media according to the present invention, the recording shortest marks can be properly performed by the shortest mark recording unit, the recording second marks can be properly performed by the second mark recording unit, the irradiating cooling pulses can be properly performed by the cooling pulse irradiating unit, and the others can be properly performed by the other units.

In the first aspect of the apparatus for recording a dye-based recordable DVD medium, the apparatus comprises a shortest mark recording unit, a second mark recording unit, and a cooling pulse irradiating unit, wherein the dye-based recordable DVD medium comprises a substrate and a recording layer formed on the substrate, the substrate comprises a guide groove to which wobble is formed, and the recording layer comprises at least an organic dye, the shortest mark recording unit is configured to record each of the shortest marks by use of one pulse beam of which the rear edge is more energized than the front edge, the second mark recording unit is configured to record each of the marks other than the shortest marks by use of one pulse beam of which the two sites of front and rear edges are energized, the cooling pulse irradiating unit is configured to irradiate cooling pulse laser beams onto the backwards of the respective pulse beams at 0.1 mW/pulse or less of optical energy, and the recording of marks is performed on the recording layer at a recording linear velocity of 42 m/sec or more.

In the second aspect of the apparatus for recording a dye-based recordable DVD medium, the second mark recording unit is configured to record each of the second shortest marks and still longer marks by use of one pulse beam of which at least the rear edge among the front and rear edges is energized to the power that is substantially the same as that of the front edge of the shortest mark. The shortest mark recording unit, the cooling pulse irradiating unit, and the recording linear velocity are substantially the same with the first aspect.

In the third aspect of the apparatus for recording a dye-based recordable DVD medium, the second mark recording unit and the third mark recording unit are employed, the second mark recording unit is configured to record each of the second shortest marks by use of a pulse beam selected from a simple rectangular pulse beam of which the power is lower than the power of the shortest mark at any moments, a pulse beam of which the front edge is energized, and a pulse beam of which the rear edge is energized, and the third mark recording unit is configured to record each of the third shortest marks and still longer marks by use of one pulse beam of which the two sites of front and rear edges are energized. The shortest mark recording unit, the cooling pulse irradiating unit, and the recording linear velocity are substantially the same with the first aspect.

In the fourth aspect of the apparatus for recording a dye-based recordable DVD medium, the second mark recording unit and the third mark recording unit are employed, the second mark recording unit is configured to record each of the second shortest marks by use of one simple rectangular pulse beam of which the power is substantially the same as that of the front edge of the shortest mark, and the third mark recording unit is configured to record each of the third shortest marks and still longer marks by use of one pulse beam of which at least the rear edge among front and rear edges is energized, and the energized power is substantially the same as that of the front edge. The shortest mark recording unit, the cooling pulse irradiating unit, and the recording linear velocity are substantially the same with the first aspect.

The first to fourth aspects of the processes for recording a dye-based recordable DVD medium may be properly performed by use of the first to fourth aspects of the apparatuses for recording a dye-based recordable DVD medium respectively.

(First Aspect)

The apparatuses for recording dye-based recordable DVD media in the first aspect are able to record in a recording layer formed on a substrate at a recording linear velocity of 42 m/sec or more by means of a unit configured to record shortest marks, a unit configured to record second marks, a unit configured to irradiate cooling pulses, and the other units selected properly depending on requirements.

—Substrate—

The substrate performs as a support on which formed are a recording layer, a guide groove having wobble for tracking, and a convex-concave preformat for guide pits and address signals.

The material of the substrate may be properly selected as long as the material is transparent for the laser beam when the recording-reproducing is carried out from the substrate side; examples of the material include plastics such as polyester resins, acrylic resins, polyamide resins, polycarbonate resins, polyolefin resins, phenol resins, epoxy resins, and polyimide; glasses, ceramics, and metals.

The shape of the substrate may be properly selected depending on the application as long as the shape is suited for the DVD recording-reproducing standard; for example, the substrate is disc shape of 120 mm diameter and thickness of 0.1 mm, 0.6 mm, or 1.2 mm.

—Wobble—

The term 'wobble' refers to "surge" or "swell wave" of a guide groove formed on the substrate. Gate signals may be provided from the wobble in place of LPP (land pre-pit) detection employed in preformats of DVD-RW and disc rotating control.

The gate signals may be properly selected depending on the application; the basic clock cycle T for identifying the wobble frequency is about 0.133 μm or about 38 nsec in the case of 4.7 GB DVD.

The frequency band of the wobble corresponds to 150 T to 400 T in general. The frequency band may not be suitable for higher density recording when data are added to record by frequency modulation or phase modulation since significant spaces inevitably exist between the prior data and the data to be additionally recorded. In order to remove this disadvantage, LPP are provided in recordable DVD-R, and the recording sites are controlled by the LPP signals.

However, in the controlling by the LPP, signals may not be read properly when the signal amplitude from LPP is smaller, on the contrary, data errors are induced frequently due to leakage of LPP signals into recording data when the LPP signal is larger. In order to avoid the disadvantage, the optimum signal amplitude is defined to be $0.18 \leq LPPb \leq 0.26$ in LPP. Accordingly, the cut width of lands should be controlled precisely at producing the stamper.

By the way, the employment of wobble can bring about that the LPP is unnecessary no longer; thus frequent data errors may be avoided in LPP process.

The wobble cycle may be properly selected depending on the application; for example, the wobble cycle is 4 T to 96 T. When the wobble cycle is less than 4 T, the detection is likely to be difficult due to excessively low frequency, and the reliability as to rotation control and address detection may be insufficient, and when the wobble cycle is more than 96 T, the spaces between the recording data is excessively wide, resulting in lower capacity or insufficient data processing rate.

As for the wobble amplitude of the recordable DVD media in the present invention, when the ratio of wobble amplitude Wo after passing through appropriate filters such as high filter at 4 MHz and low filter at 30 kHz to push-pull amplitude PP after passing through a filter at 30 kHz, i.e. Wo/PP, satisfies the relation $0.1 \leq Wo/PP \leq 0.4$, the synchronization adjustment is relatively easy, preferably is $0.15 \leq Wo/PP \leq 0.3$.

When Wo/PP is less than 0.1, the signal intensity is insufficient to synchronize, and when Wo/PP is more than 0.4, the data errors tend to increase. In this type, the DVD media having larger LPP do not cause significantly data errors compared to LPP type, i.e. data errors tend to increase gradually along with the increase of wobble amplitude.

In the preparation of the stamper, the LPP type requires precise cut width control in order to adjust the LPP cut width into 0.18 to 0.26, whereas the wobble type in the present invention requires no more than the control of RF source and swing level, i.e. the circuit to control the swing level may adjust the swing level properly, therefore, the yields of stampers and DVD media can be increased remarkably.

As for the groove shape of the substrate on which the format is formed, the groove depth is preferably 1000 to 2500 angstroms, more preferably is 1500 to 2000 angstroms in the case that recording layers are formed using an organic dye by solvent coating processes. When the groove depth is less than 1000 angstroms, the tracking may not be controlled appropriately due to insufficient push-pull signals, and then the grove depth is more than 2500 angstroms, the transferring ability may be deteriorated at molding substrates.

Preferably, as for the dye groove depth d1 when a dye recording layer is provided, the following relation is preferable:

$$1200 \leq d1 \times m \leq 160000$$

wherein mT: wobble frequency (m: natural number)

When (d1×m) is less than 1200, the differential signals are insufficient, the tracking may not be performed appropriately at recording and reproducing, and when (d1×m) is more than 160000, oscillation may be induced that may adversely effect on the tracking. By the way, the groove depth of substrates are typically limited by the transferring limit due to the substrate molding described above, thus the groove depth is limited to no more than 160000 in practice.

The pitch of tracks is typically required to be 0.64 to 0.8 μm in order to assure the recording density of 4 to 5 GB. The groove width depends on the recording material in general; usually the half-width is 0.18 to 0.40 μm in almost organic materials.

—Recording Layer—

The recording layer is formed on a substrate, on which a guide groove are provided, and the wobble described above is formed on the guide grooves. The recording layer contains at least an organic dye as the main component and has an optical property so that irradiating laser beam induces an optical change that is utilized for recording and/or reproducing information.

The optical property may be properly selected depending on the application; preferably, the refractive index "n" and the extinction coefficient "k" of the recording layer are $1.5 \leq n \leq 3.0$ and $0.02 \leq k \leq 0.2$, in a condition that the wavelength of the measured light is L±5 nm, wherein L is the wavelength of pulse beam for recording and reproducing, and the recording layer is a monolayer.

When "n" is less than 1.5, the optical change is likely to be insufficient and the recording modulation is likely to be lower, and when "n" is more than 3.0, the wavelength effects too sensitively, thus errors tend to be induced even within the wavelengths for recording and reproducing.

When "k" is less than 0.02, the recording sensitivity is likely to be lower, and when "k" is more than 0.2, the reflection level may be no more than 50%.

DVD-ROMs are typically standardized at near the wavelength of 650 nm; the wavelength of the pulse beam for recording media is standardized at 650 to 660 nm for popular applications in addition to 635 nm for authoring exclusive media. However, these wavelengths are no more than the targets, namely each of the wavelengths may be larger or smaller depending on the fluctuations at producing the semiconductor laser diode (LD) tips and the like. Further, LDs typically tend to inherently increase the wavelength when temperature rises. The recording layer in the present invention is applicable within the wavelength range of 600 to 720 nm including the range described above in the first to the fourth aspects.

Figure 2A:
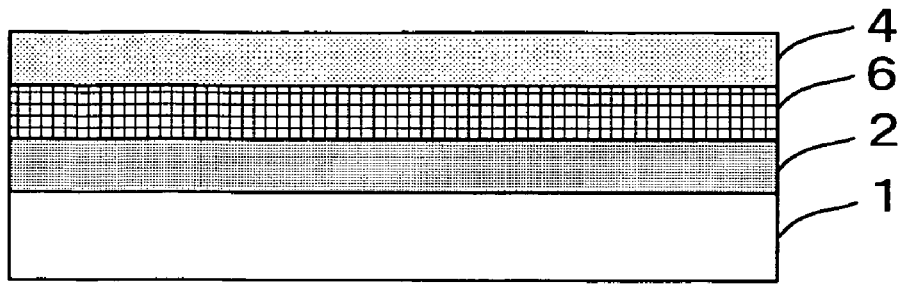
FIG. 2A exemplarily shows a layer construction of a conventional recordable CD-R medium.
Figure 2B:
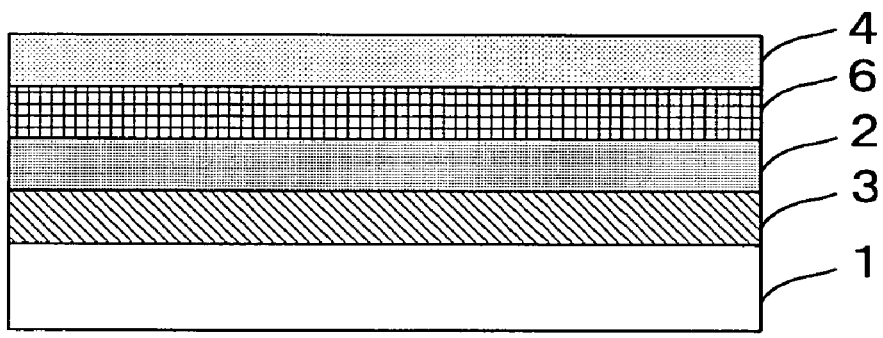
FIG. 2B exemplarily shows another layer construction of a conventional recordable CD-R medium.
Figure 2C:
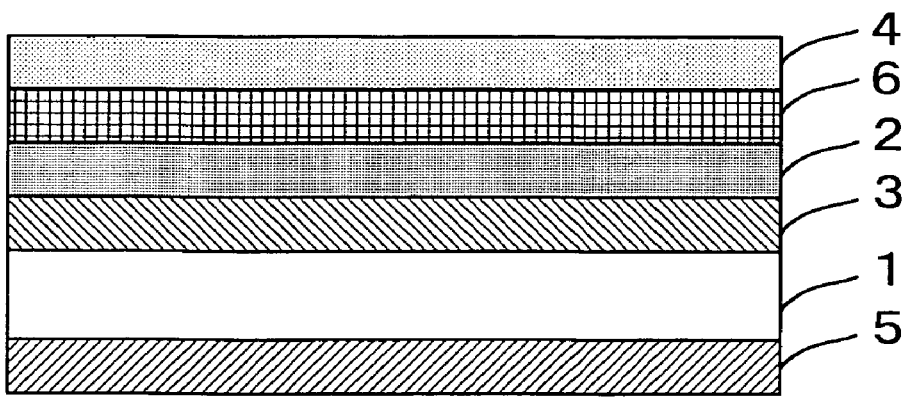
FIG. 2C exemplarily shows still another layer construction of a conventional recordable CD-R medium.
Figure 3A:
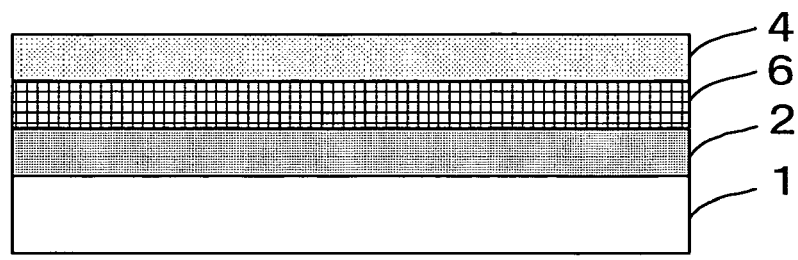
FIG. 3A exemplarily shows a layer construction of a dye-based recordable DVD medium.
Figure 3B:
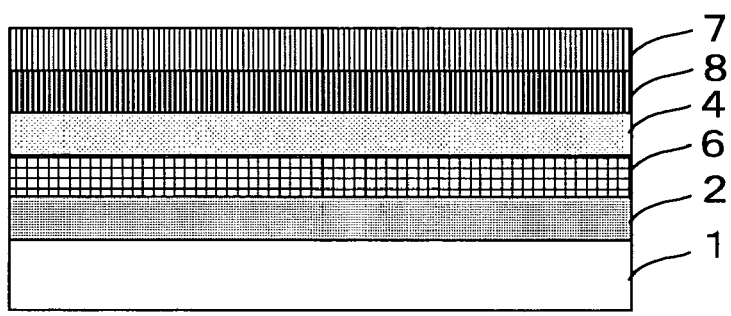
FIG. 3B exemplarily shows another layer construction of a dye-base recordable DVD medium.
Figure 3C:
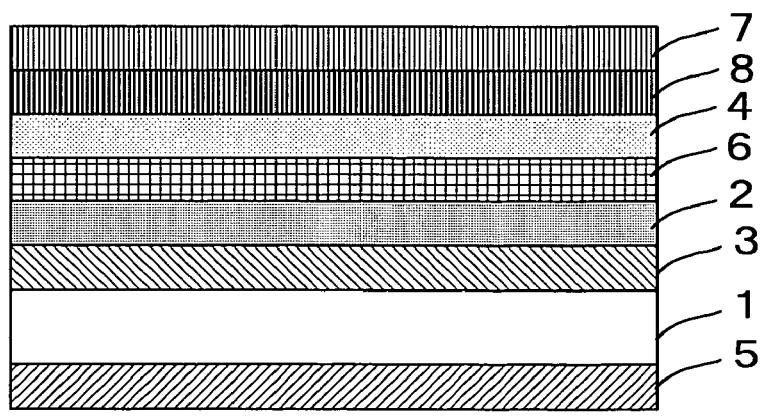
FIG. 3C exemplarily shows still another layer construction of a dye-base recordable DVD medium.

The construction of recording layer may be properly selected depending on the application; for example, the construction may be the layer construction of usual recordable optical discs shown in FIGS. 1A to 1D, the layer construction of usual CD-R media shown in FIGS. 2A to 2C, and the layer construction of recordable DVD media shown in FIGS. 3A to 3C. Among these, such a construction is preferable for the dye-based recordable DVD media that the first substrate and the second substrate as a protective layer are laminated with the recording layer interposed therebetween by means of an adhesive as shown in FIGS. 3B and 3C.

The recording layer may be a monolayer of an organic dye-based layer, or may be a laminated layer of an organic dye-based layer and a reflective layer to increase the reflectivity. Further, an undercoat layer and/or a protective layer may be provided between the recording layer and the substrate; a protective substrate and/or a hard-coat layer may be provided on the substrate. Each of these layers may be of monolayer construction or of laminated construction of two or more layers. Among these constructions, the construction of "first substrate/organic dye layer/reflective layer/protective layer/adhesive layer/second substrate (protective substrate)" is preferable, which is one of the most popular constructions.

Through FIGS. 1A to 1D, 2A to 2C, and 3A to 3C, reference numbers 1 to 8 designate 1: substrate, 2: recording layer, 3: undercoat layer, 4: protective layer, 5: hard coat layer, 6: reflective layer, 7: protective substrate, and 8: adhesive layer.

The thickness of the entire recording layer may be properly selected depending on the application; preferably, the thickness is 100 angstroms to 10 μm, more preferably is 200 to 2000 angstroms.

The material of the recording layer may be properly selected depending on the application, as long as the material contains an organic dye as one of the main components; for example, such materials are exemplified as the material of the recording layer that an amount of organic dye sufficient for recording and reproducing is included, and optional additives are included in relatively small amount depending on the requirements.

Examples of the organic dyes include azo compounds, formazan compounds, dipyrromethene compounds, (poly) methyne compounds, naphtalocyanine compounds, phtalocyanine compounds, tetraazaporphyrin compounds, squarylium compounds, chloconium compounds, pyrylium compounds, naphthoquinone compounds, anthraquinone compounds, indanthrene compounds, xanthene compounds, triphenylmethane compounds, azulene compounds, tetrahydrocoline compounds, phenanthrene compounds, triphenothiazine compounds, and metal complexes thereof.

Among these compounds, azo compounds, formazan compounds, squarylium compounds, dipyrromethene compounds, trimethynecyanine compounds, tetraazaporphyrin compounds, and metal complexes thereof are preferable.

The thermal decomposition property of these dyes may be properly selected depending on the application; preferably, the initial decomposition temperature or kick-off temperature is 100 to 360° C., more preferably is 100 to 350° C. When the kick-off temperature is less than 100° C., the storage stability of discs may be deteriorated, and when the kick-off temperature is above 360° C., the pits may not formed successfully, thus the jitter property may be lowered.

The dyes described above may be added with another organic dye, metal, or metal compound, in order to improve the optical characteristics, recording sensitivity and/or signal characteristics. Examples of such additional metals and metal compounds include In, Te, Bi, Se, Sb, Ge, Sn, Al, Be, $TeO_2$, SnO, As and Cd.

Further, examples of the optional additives include polymer materials such as ionomer resins, polyamide resins, vinyl resins, natural polymers, silicones, and liquid rubbers; silane coupling agents, stabilizers such as transition metal complexes, dispersants, flame-retardants, lubricants, antistats, surfactants, and plasticizers.

The method for producing the recording layers may be properly selected depending on the application, for example, such conventional methods are available as vapor deposition method, spattering method, CVD method, and coating method. The coating method may be carried out by dissolving materials described above in an organic solvent to form a coating liquid, then the coating liquid is processed by conventional coating method such as spray coating, roller coating, dip coating, and spin coating.

The organic solvent may be properly selected depending on the application; examples of the organic solvent include alcohols such as methanol, ethanol, and isopropanol; ketones such as acetone, methyl ethyl ketone, and cyclohexanone; amides such as N,N-dimethylformamide and N,N-dimethylacetamide; sulfoxide such as dimethylsulfoxide; ethers such as tetrahydrofuran, dioxane, dimethylether, and ethyleneglycol monomethylether; esters such as methyl acetate and ethyl acetate; halogenated hydrocarbons such as chloroform, methylene chloride, dichloroethane, carbon tetrachloride, and trichloroethane; aromatics such as benzene, xylene, monochlorobenzene, and dichlorobenzene; cellosolve such as methoxy ethanol, ethoxy ethanol; and hydrocarbons such as hexane, pentane, cyclohexane, and methyl cyclohexane.

—Undercoat Layer—

The undercoat layer is disposed for the purposes of (1) improving the adhesion, (2) serving as a barrier layer against water or gases, (3) improving the shelf life of the recording layer, (4) improving the reflectivity of the recording layer, (5) protecting the substrate from solvents, and/or (6) forming guide grooves, guide pits, preformats, and the like.

To attain the above-noted purpose (1), various polymer compounds such as ionomer resins, polyamide resins, vinyl resins, natural resins, natural polymers, silicones, and liquid rubbers, and silane coupling agents may be employed. To attain the purposes (2) and (3), inorganic compounds such as SiO, $MgF_2$, $SiO_2$, $TiO_2$, ZnO, TiN, and SiN can be used in addition to the above-described polymer materials. Further, metals and semimetals such as Zn, Cu, Ni, Cr, Ge, Se, Au, Ag, and Al can be used. To attain the purpose (4), metals such as Al and Ag, and organic thin films having a metal luster such as methine dye and xanthene dye may be used. To attain the purposes (5) and (6), an ultraviolet-curing resin, a thermosetting resin, and a thermoplastic resin can be used.

The thickness of the undercoat layer may be properly selected depending on the application; preferably, the thickness is 0.01 to 30 μm, more preferably is 0.05 to 10 μm.

—Reflective Layer—

The material of the reflective layer may be properly selected depending on the application; preferably, the material is selected from metals and semimetals exhibiting high reflectivity corrosion resistance such as Au, Ag, Cr, Ni, Al, Fe, and Sn. Among these metals, Au, Ag, and Al are particularly preferred in view of the reflectivity and the productivity. These metals and semimetals may be used alone or in combination as alloys.

The thickness of the reflective layer may be properly selected depending on the application; preferably, the thickness is 50 to 5000 angstroms, more preferably is 100 to 3000 angstroms. The reflective layer may be formed by deposition, sputtering or the like.

—Protective Layer and Hard Coat Layer—

The protective layer and the hard coat layer on the substrate surface may be provided in order to (1) protect the recording layer or the reflection absorbing layer from scratches, dust, and contamination, (2) improve the shelf life of the recording layer or the reflection absorbing layer, and (3) improve the reflectivity. To satisfy these purposes, materials similar to those used for the undercoat layer may be used. In addition, organic materials of thermoplastic materials, thermosetting materials, and UV curable resins are available such as polymethacrylate resins, polycarbonate resins, epoxy resins, polystyrene resins, polyester resins, vinyl resins, cellulose resins, aliphatic hydrocarbon resins, aromatic hydrocarbon resins, natural rubber, styrene-butadiene resins, chloroprene rubbers, waxes, alkyd resins, drying oils, and rosins. Among these, UV curable resins are preferable owing to the higher productivity.

The thickness of the protective layer or the hard coat layer may be properly selected depending on the application; preferably, the thickness is 0.01 to 30 μm, more preferably is 0.05 to 10 μm.

The protective layer or the hard coat layer on the substrate surface may be incorporated with a stabilizer, dispersant, flame retardant, lubricant, antistatic, surfactant, and/or plasticizer as is the case of the recording layer.

—Adhesive Layer—

The material of the adhesive layer may be properly selected depending on the application; preferably, the material of the adhesive layer is selected from UV curable adhesives and ho-melt adhesives owing to the productivity.

—Protective Substrate—

The protective substrate is required to be transparent to a laser beam when the laser beam is irradiated through the substrate, otherwise the transparency is not required. The materials for the protective substrate are utterly the same as those for the substrate; for example, plastics such as polyesters, acrylic resins, polyamides, polycarbonate resins, polyolefin resins, phenol resins, epoxy resins, and polyimides; glass, ceramics, metals, and the like may be used.

—Shortest Mark Recording—

The shortest mark recording unit performs recording by use of laser pulse in which the rear edge of the laser pulse is more energized than the front edge of the laser pulse.

The shortest marks are the marks that have the shortest length to be recorded in the recording layer for detecting signals and the like. The length of the shortest marks is about 0.89 μm in CD, about 0.4 μm in DVD, and about 0.16 μm in BD (blu-ray disc) that utilize blue-violet laser beam of relatively short wavelength. In general, the shorter is the marks, the larger is the recording capacity.

As explained before, basic clock cycle T for identifying the wobble frequency is about 0.133 μm or about 38 nsec in the case of 4.7 GB DVD; therefore, the shortest marks are about 6.7 T in CD, about 3 T in DVD, and about 1.2 T in BD; alternatively, the durations are about 254.6 nsec in CD, about 114 nsec in DVD, and about 45.6 nsec in BD.

One of the objects in the present invention is to improve recording quality at higher linear velocity recording. In such higher linear velocity recording, uniform formation of the shortest marks typically effects on the resulting recording quality. In the first to the fourth aspect according to the invention, each of the front edge of the shortest marks is made smaller than each of the rear edges of the shortest marks, which may reduce the effect of overshooting of laser pulse; each of the rear edges of the shortest marks is more energized than the other portions as well as the mark formation at the front edges of the shortest marks is made more uniform and stable, which may bring about higher quality of the resulting shortest marks.

The duration of the laser pulse for recording the shortest marks may be properly selected depending on the application; preferably, the marks are as uniform as possible in order to enhance the recording quality at higher linear velocity recording, the power to form each of the rear edges of the laser pulse is more energized than the power to form each of the front edges.

Specifically, the length of the energized pulse for forming the rear edges is preferably 0.1 T to 2.3 T, more preferably is 0.3 T to 1.8 T. When the length is less than 0.1 T, the energized effect is not significant which is similar to the rectangular pulse, and when the length is more than 2.3 T, excessive recording power is irradiated beyond the desirable pulse, i.e. overshooting is significant and the uniformity is likely to be deteriorated.

As for the power to form the shortest marks, preferably, W1/W0 is 1.01 to 1.50, more preferably is 1.05 to 1.30; wherein W0 is the power for the front edge of the shortest marks and W1 is the power for the rear edge of the shortest marks. The condition that W0 is less than W1 may mitigate the effect of overshooting. The overshooting is typically 1.05 to 1.30 in usual pickups, thus the W1/W0 is preferably controlled into 1.05 to 1.30 correspondingly.

—Second Mark Recording—

In the first aspect according to the present invention, second mark recording is carried out such that the marks other than the shortest marks are recorded by use of laser pulses each of which is energized at both of front and rear edges.

The marks are intended for recording data, information, or the like; the marks are desired to be as uniform as possible in order to enhance the recording quality at high linear velocity recording.

The power for the mark recording may be properly selected depending on the application; preferably, W2/W3 is 1.05 to 3.00, more preferably is 1.10 to 2.00; wherein W2 is the additional power for both of front and rear edges, and W3 is the power without the additional power. As for the relation with the W1 for the rear edge of the shortest marks described above, W1/W2 is preferably 1.00 to 2.00, more preferably is 1.05 to 1.50.

Figure 6:
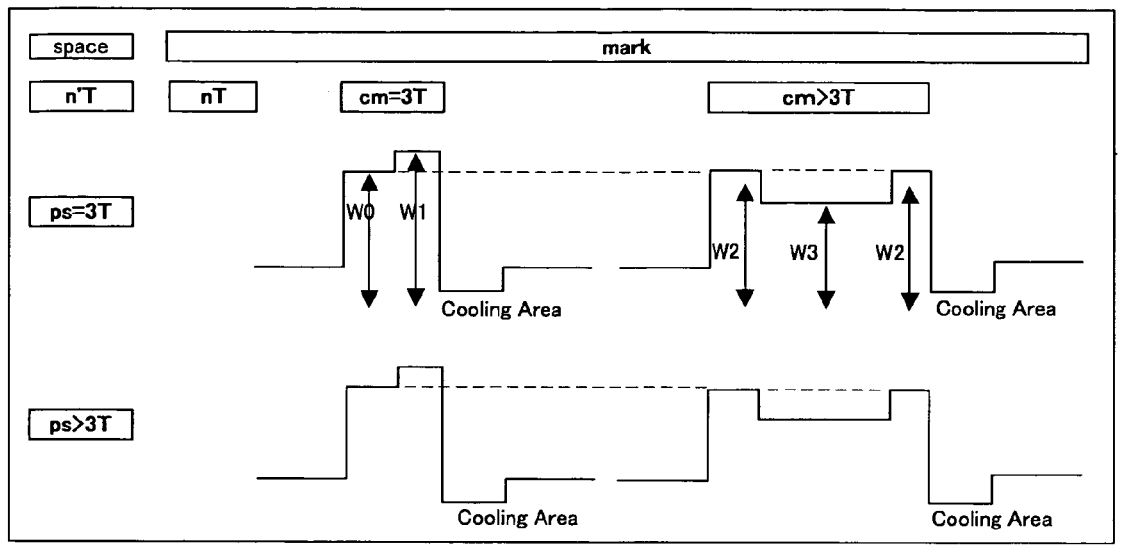
FIG. 6 exemplarily shows power control waveforms corresponding to the first aspect according to the present invention at recording linear velocities of 56 m/sec and 42 m/sec.

Such pulse waveforms may lead to proper recording with lower jitter at higher linear velocity recording in particular. FIG. 6 shows an exemplary recording waveforms corresponding to the first aspect.

Specifically, FIG. 6 shows waveforms in which rear edge of the shortest mark is energized, the mark other than shortest mark is energized at two sites of the rear edge and front edge. In this waveform, rear edge of the shortest mark is energized and the mark other than shortest mark is energized at the rear edge and front edge, therefore both of asymmetry and jitter may be improved.

The "asymmetry" relates to the data level shifted from central detecting site due to signal asymmetry in RF signals at pickup output of recording/regenerating apparatus, and the "asymmetry" is expressed by the ratio of the shifted level to the total amplitude. The shift may generate by disc or pickup properties. Typically, the higher is the asymmetry, the more jitter or error rate is induced, since the determination level of apparatuses usually corresponds to the central signal level.

The term "jitter" refers to the frequency or rate of errors that occur in digital signal transmission; for example, when one error exists in one hundred data, the jitter or error rate is 1%.

The reason to partially energize the shortest marks and those other than the shortest marks is to avoid the adverse effect of the overshooting of recording pulses; namely, the front edge of laser pulse emitted from recording/regenerating apparatuses often causes overshooting, thus excessive recording power is emitted beyond the pre-determined level and also the pulses are usually unstable; such conditions typically deteriorate the recording property, in particular adversely effect on the shortest marks significantly during higher velocity recording.

Conventionally, when dye-based discs are recorded at higher linear velocity, the linear velocity of more than 42.0 meters per seconds (m/sec) typically leads to inferior jitter property at the shortest pit length; in addition, jitter property is deteriorated at the shortest pit due to the influence of overshooting fluctuation of pulses for forming the shortest pits; accordingly, sufficient recording property is hardly obtainable at higher linear velocity.

When recording is performed without partially energizing the shortest marks and those other than the shortest marks as in the prior art, the power margin tends to decrease due to the difference of the power at which the lowest jitter is obtainable and the power at which the error is least. Specifically, the recording power, at which the least jitter is obtainable in higher linear recording, tends to induce the asymmetry of recording signals to minus side, and tends to cause errors even at lower jitter.

On the other hand, even the media are of minus asymmetry, lower jitter, and less errors, the media are likely to gradually cause more errors with time than the media recorded at nearly zero of asymmetry. The first to the fourth aspects of the present invention may address the problem due to lower asymmetry.

—Compensation of Mark Recording—

The compensation of mark recording refers to the control of pulse width of recording marks so as to improve the recording/regenerating quality. The compensation is preferably performed through the first to the fourth aspects according to the present invention.

The compensation may be properly selected depending on the application; for example, the compensation is performed as follows: when a mark of which just before the space is the shortest is to be recorded, the mark is examined whether the mark is the longest or not, and the heating pulse width at the front edge of the shortest mark is determined to be longer than the heating pulse width at the front edge of other than the shortest mark; alternatively, when the shortest mark is to be recorded, the space just before the mark is examined whether the space is the longest or not, and the heating pulse width at the front edge of the mark of which the immediately front space being shortest is determined to be shorter than the heating pulse width at the front edge of other than the shortest space.

The method to determine the pulse width may be properly selected depending on the application, and the compensation level is preferably 0.02 T to 0.10 T.

Specifically, when the space just before the mark to be recorded is of the shortest, and when the pulse width at the front edge of the mark is approximately the same with the pulse width of the other marks, the space length of the space just before the mark turns to shorter due to thermal influence, and the jitter may be somewhat deteriorated. When the heating pulse width at the front edge is shortened, the effect is significant. Further, the shortening of the front edge of the heating pulse may effectively determine to shorten the pulse width.

By the way, when the space just before the mark to be recorded is of the shortest, less than 0.10 T of the heating pulse width at the front edge may result in an excessively short mark.

Preferably, the compensation level or duration to control the heating pulse width at the front edge of the shortest mark to be longer than that of the other marks is 0.05 T to 0.25 T. When the recording linear velocity is higher in particular, the shortest marks hardly form; therefore, the compensation to make long the pulse width at the front edge of the shortest mark may bring about recordings with lower jitter.

The specific examples of the compensation of the heating pulse width at the front edge is shown in Table 1 in terms of recording mark length and the space length of just before.

TABLE 1

| | | Mark Length to be Recorded | |
|---|---|---|---|
| | | 3T | 4T to 14T |
| Space Length of Just before | 3T | ±0.00T | −0.05T |
| | 4T to 14T | +0.05T | ±0.00T |

In the mark recording, the method other then the present invention to record one mark by use of plural pulses or multi pulses may possibly solve the problems associated with the lower asymmetry when the pulse beam is optimized. However, plural laser pulses will cause fluctuation in rising duration and falling duration, possibly resulting in fluctuation of recording quality. The higher is the linear recording, the more significant will be the fluctuation.

On the contrary, in the first to the fourth aspects of the present invention, the method to record one mark by use of one pulse may bring about an advantage that the fluctuation of recording quality is lower than the multi pulse method described above. Further, in address detection during the recording according to the present invention, the recording waveform simpler than that of the multi pulse method may allow to equalize easily the optical quantity at recording, and may allow address detection while equalizing not only the reflected optical quantity at spaces but also the optical quantity at marks, and also the address detection may be easily carried out advantageously even when cooling pulse of 0.1 mW or less is provided at the rear end of the pulse.

—Irradiation of Cooling Pulse Beam—

In the irradiation of the cooling pulse beam, to the backward of each of the pulse rear ends, a cooling pulse beam of 0.1 mW or less is irradiated. The irradiation of the cooling pulse beam may perform to sharpen well the mark edges especially when the recording power is raised, thereby the thermal influence between marks comes to remarkable, and the effect of overshooting turns to be more significant.

The power for irradiating the cooling pulse beam may be properly selected within the range of 0.1 mW or less. When the power is more than 0.1 mW, the mark edge may not be sharpened successfully.

The irradiation duration of the cooling pulse beam may be properly selected depending on the application; preferably, the irradiation duration is 1/6 to 6/6 of the irradiation duration of the shortest space, i.e. 6.3 to 38 nsec, which duration may improve the recording quality effectively. When the irradiation duration is longer than 6/6 of the irradiation duration of the shortest space, the cooling area may possibly exceed the shortest space and extend to the next mark. When the cooling pulse is not employed, the residual heat or the remaining thermal may influence the waveform, which may degrade the jitter property. Excessively short cooling may result in inferior jitter property as that of without cooling pulse.

For example, in a DVD media, when the irradiation duration of cooling pulse is 6/6 of the irradiation duration of the shortest space, the jitter is 70% when the recording is performed at 42 m/sec of recording linear velocity; and the effect of the irradiation duration is as follows. Namely, the jitter deteriorates significantly at the region below 1/6, preferable lower range is understood to be 1/6.

| Irradiation Duration | Jitter | Asymmetry | PI error |
|---|---|---|---|
| 5/6 | 7.1% | 0.01 | 6 |
| 4/6 | 7.2% | 0.01 | 6 |
| 3/6 | 7.4% | 0.01 | 7 |
| 2/6 | 7.4% | 0.01 | 8 |
| 1/6 | 7.5% | −0.01 | 14 |
| 0.5/6 | 7.5% | −0.05 | 24 |
| 0/6 | 7.7% | −0.08 | 47 |

As for the other means, shortening the pulse duration may lead to property improvement, the recording sensitivity may be deteriorated unless higher irradiating power is not provided. Therefore, the recording apparatuses that cannot irradiate at such higher power cannot record at higher velocity.

—Recording Linear Velocity—

The recording linear velocity means the linear velocity at recording site while rotating the substrate; the standard velocity is 3.49 m/sec, i.e. 42 m/sec of the recording linear velocity corresponds to so-called 12 times high velocity.

The higher is the recording linear velocity, the sooner one disc can be recorded. Although the sooner recording is preferred, the recording quality presents a limit since the higher recording the higher power and accuracy are required. In the first aspect according to the present invention, the recording layer may record information with higher quality at a recording linear velocity of 42 m/sec or more.

—Recording Apparatus—

The recording apparatus may be properly selected depending on the application; for example, the recording apparatus may be generally available recording/regenerating apparatuses that utilize optical discs.

The optical discs utilized in the recording/regenerating apparatuses may be properly selected depending on the application; examples of the optical discs include DVD-RAM•WO, DVD-R, DVD+R, DVD-RAM, DVD-RW, and DVD+RW. The DVD-RAM•WO, DVD-R, and DVD+R are those capable of recording one time; and DVD-RAM, DVD-RW, and DVD+RW are those capable of recording plural times.

The recording/regenerating apparatuses perform recording and/or regenerating on these optical discs.

—Recording/Regenerating Apparatus—

Figure 4:
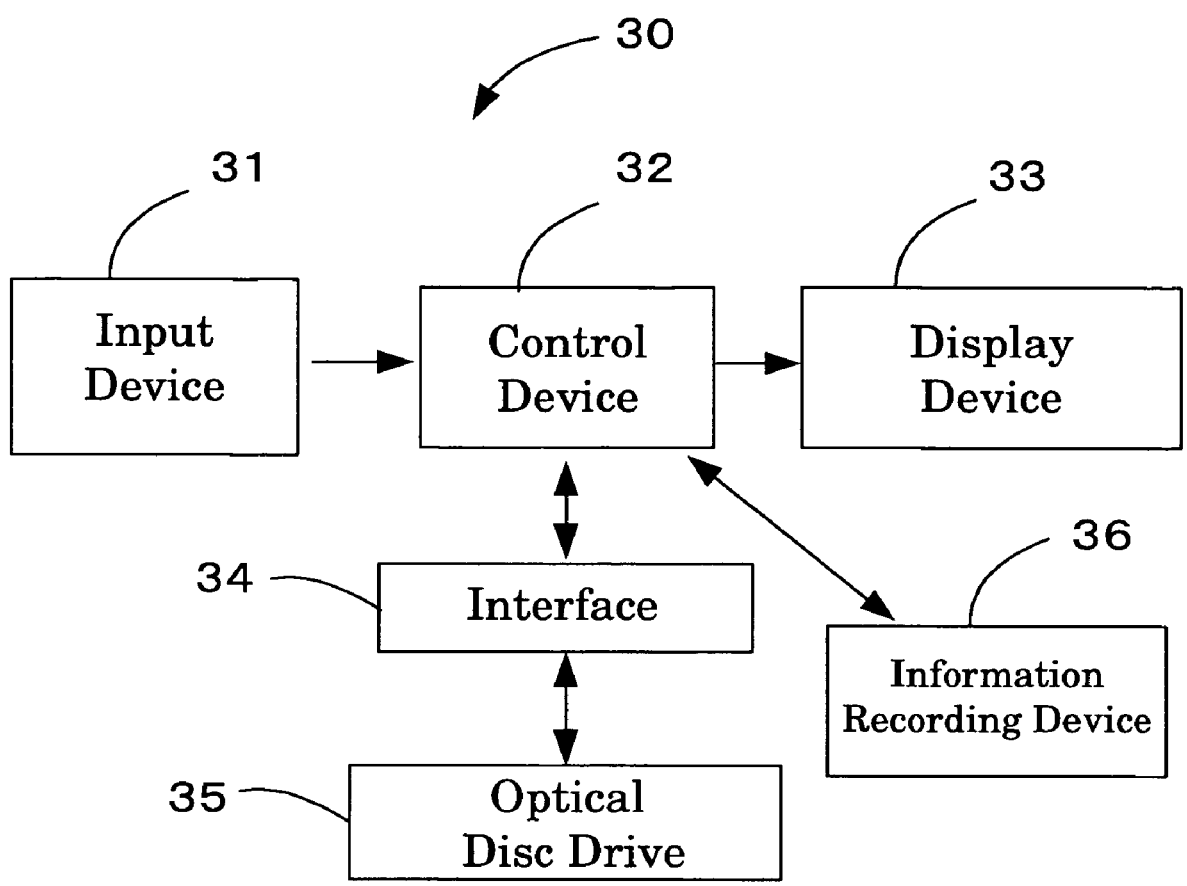
FIG. 4 schematically shows an exemplary construction of a recording-reproducing apparatus.

The recording/regenerating apparatus 30 comprises input device 31, control device 32, display device 33, interface 34, optical disc drive 35, information recording device 36, and the like as shown in FIG. 4. In addition, the recording/regenerating apparatus 30 equips an operating system (OS), which controls all of the devices mounted to the apparatus.

The input device 31 equips at least one input medium (not shown) such as a keyboard, mouth, and pointing device, and informs various information to control device 32. Further, CRT equipped with a touch panel may be available as an integrated device of display 33 and input device 31.

The control device 32 is constructed from a CPU (central processing unit), main memory, and the like, and controls the entire host computer thereby.

Display device 33 equips a displaying portion (not shown) such as a CRT, liquid crystal display (LCD), and plasma display panel (PDP), and displays various information from control device 32 thereby.

Interface 34 is a communication interface interactive with optical disc drive 35, and is based on standard interfaces such as ATAPI and CSI. Interface 34 is connected to interface 25 of optical disc drive 35 described above. The connection between the respective interfaces may be not only cable connection by means of communication line or cable such as SCSI cable but also wireless connection utilizing infrared ray for example. Optical disc drive 35 is shown in FIG. 5 explained later.

Information recording device (HDD, hard disc) 36 is equipped with a program written by a cord readable by the microcomputer of control device 32. When the driving power source of the recording/regenerating apparatus 30 is turned on, the program is loaded on the main memory of the control device 32.

—Optical Disc Drive—

Figure 5:
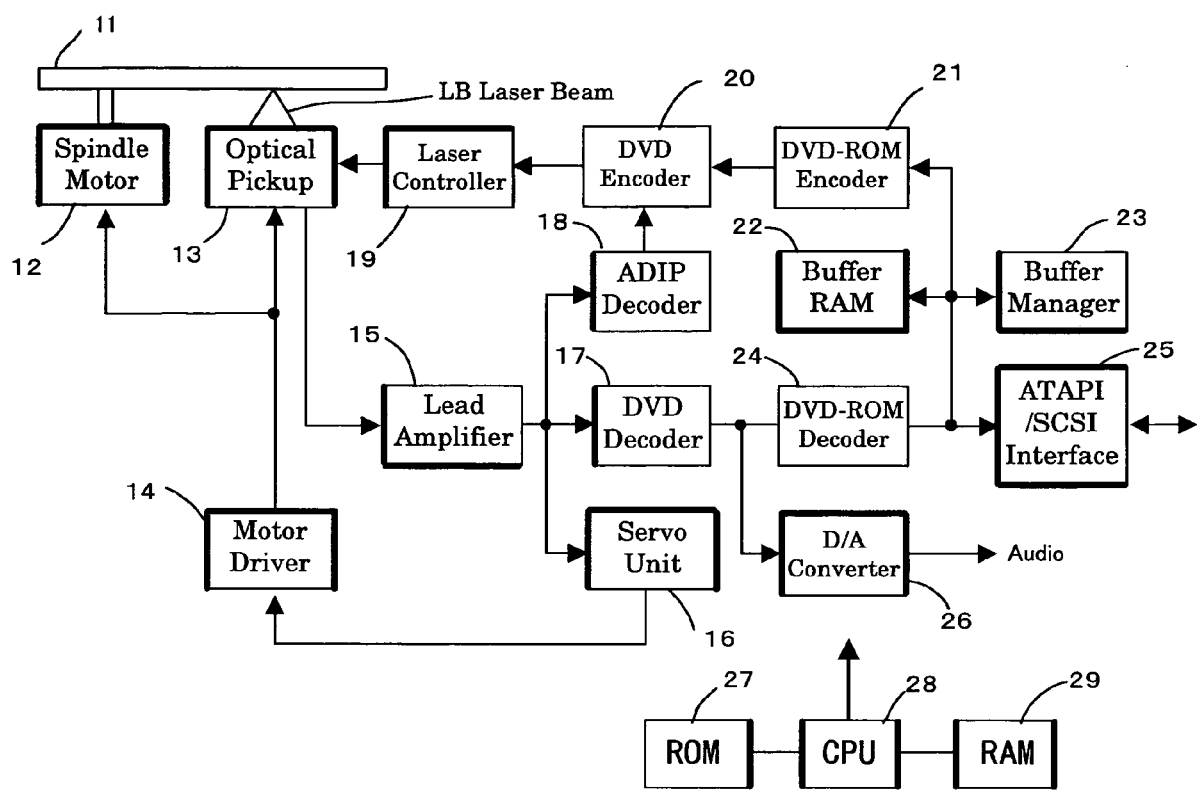
FIG. 5 schematically shows a functional block diagram of an optical disc drive.

FIG. 5 is an exemplary functional block diagram of an optical disc drive that exhibits main construction, the arrow marks indicates the main direction of data flow. In order to avoid a complicated expression in the figure, CPU 28 that controls the respective blocks in FIG. 5 is expressed by removing the connections with the respective blocks. In the ROM 27, a control program is equipped that is written by a cord readable by the CPU 28.

When the power source of the optical disc drive is turned into on, the program is loaded on a main memory (not shown), CPU 28 controls the respective parts in accordance with the program, and storages necessary data to control into RAM 29 temporarily.

The construction and action of the optical disc drive is as follows. Optical disc 11 is driven to rotate by spindle motor 12. The spindle motor 12 is controlled by motor driver 14 and servo unit 16 so as to make constant the linear velocity or the angular velocity. The linear velocity or the angular velocity may be changed step-wise.

The optical pickup 13 contains a semiconductor laser, optical system, focus actuator, track actuator, receiving optics, and position sensor (not shown respectively), and irradiates laser beam LB onto optical disc 11. The optical pickup 13 can be moved in a sledge direction by a seek motor. These focus actuator, track actuator and seek motor are controlled by motor driver 14 and servo unit 16 based on the signals from the receiving optics and the position sensor so as to situate the spot of laser beam LB on the intended site of optical disc 11.

As leading stage, regenerating signals obtained by optical pickup 13 are amplified and dichotomized by lead amplifier 15, and inputted into DVD decoder 17. The inputted and dichotomized data are demodulated by 8/16 at DVD decoder 17. The recording data are bundled by every 8 bits and modulated to 8/16 modulation, and 8 bits are transformed into 16 bits in the modulation. In this case, the combined bits are assigned such that the prior numbers of "1" and "0" are equal when averaged, which is referred to as "suppression of DC component" wherein the fluctuation of slice level of DC cut regeneration signals is suppressed.

The demodulated data are processed with respect to deinterleave and error correction. Then the data are inputted into DVD-ROM decoder 24, and further processed with respect to error correction so as to enhance the data reliability. The data subjected to two times error correction are stored once at buffer RAM 22 by means of buffer manager 23, and transferred to a host computer (not shown) at the same time through ATAPI/SCSI interface 25 at the stage that the data are collected as sector data. In the case of music data, the data from DVD decoder 17 is inputted to D/A converter 26, then taken out as audio output signals Audio of analog data.

Further, at the stage of writing, the data sent from the host computer through ATAPI/SCSI interface 25 is stored at buffer RAM 22 by buffer manager 23 once. Then, the writing action starts; before the action, the laser spot is required to situate at the writing initiating site. The site is determined from wobble signals recorded by slight sinusoidal waves of tracks on optical disc 11 in the case of DVD+RW/+R.

Further, the site is determined by land pre-pits in the case of DVD-RW/−R, by pre-pits in the case of DVD-RW/RAM•WO in place of wobble signals.

The wobble signals in DVD RW/+R contain address signals of so-called ADIP (address in pre-groove), which are taken out by ADIP decoder 18. The synchronous signals generated by ADIP decoder 18 are inputted to DVD encoder 20, which enable to write data at correct sites on optical disc 11. The data of buffer RAM 22 are subjected to addition of error correction code and/or interleave by DVD-ROM encoder 21 and/or DVD encoder 20, then are recorded into optical disc 11 by the use of recording waveforms in the present invention through laser controller 19 and optical pickup 13.

The optical disc drive records, on dye-based recordable DVD media having wobble at a guide groove of substrates, each of the shortest marks by the used of one pulse beam of which the rear end is energized, each of the marks other than the shortest marks by the use of one pulse beam of which the two front and rear ends are energized; and each of the backsides of the respective marks is irradiated at an controlled optical quantity of 0.1 mW or less, consequently, high quality recording can be attained under higher linear velocity.

The optical disc drive may control the duration of cooling pulse irradiation at the backwards of the respective marks within the range of 1/6 to 6/6 of the shortest spaces, which may result in higher recording quality due to the appropriate selection of the duration.

The optical disc drive performs to control the heating pulse width at the front edge as follows: the heating pulse width at the front edge of which the just before the space is the shortest is distinguished depending on whether the mark to be recorded is the shortest or not, and the heating pulse width at the front edge of the shortest mark is determined to be longer than the heating pulse width at the front edge of other than the shortest mark; and the heating pulse width at the front edge of the shortest mark is distinguished depending on whether the space just before the mark is the shortest or not, and the heating pulse width at the front edge of the mark of which the just before the space is the shortest is determined to be shorter than the heating pulse width at the front edge of the mark of which the just before the space is not the shortest.

Consequently, recordings with higher quality i.e. lower jitter may be achieved.

Further, the way to take the address information may be that take the information from the land pre-pits or pre-pits.

(Second Aspect)

The apparatuses for recording dye-based recordable DVD media in the first aspect are able to record on a recording layer formed on a substrate at a recording linear velocity of 42 m/sec or more by means of a shortest mark recording, second mark recording unit, cooling pulse irradiating unit, and the other units selected properly depending on requirements.

The substrate, recording layer, shortest mark recording unit, cooling pulse irradiating, and the other units may be substantially the same as those of the first aspect.

—Mark Recording—

In the mark recording, each of the second shortest mark and still longer marks is recorded by one pulse beam of which at least the rear end among the respective front and rear ends are energized, and the energized power is the same as the power for recording the front end of the shortest mark.

The marks are intended for recording data, information, or the like; the marks are desired to be as uniform as possible in order to enhance the recording quality at high linear velocity recording.

The power for the mark recording may be properly selected depending on the application; preferably, $W1/W2$ is 1.05 to 3.00, more preferably is 1.08 to 2.00; wherein $W1$ is the additional power for the second shortest mark and still longer marks of the respective front and rear ends, and the energized power is the same as the power for recording the front end of the shortest mark, and $W2$ is the power without the additional power.

Such pulse waveforms may lead to proper recording with lower jitter at higher linear velocity recording in particular. FIGS. 7 to 10 exemplarily show recording waveforms corresponding to the second aspect.

Figure 7:
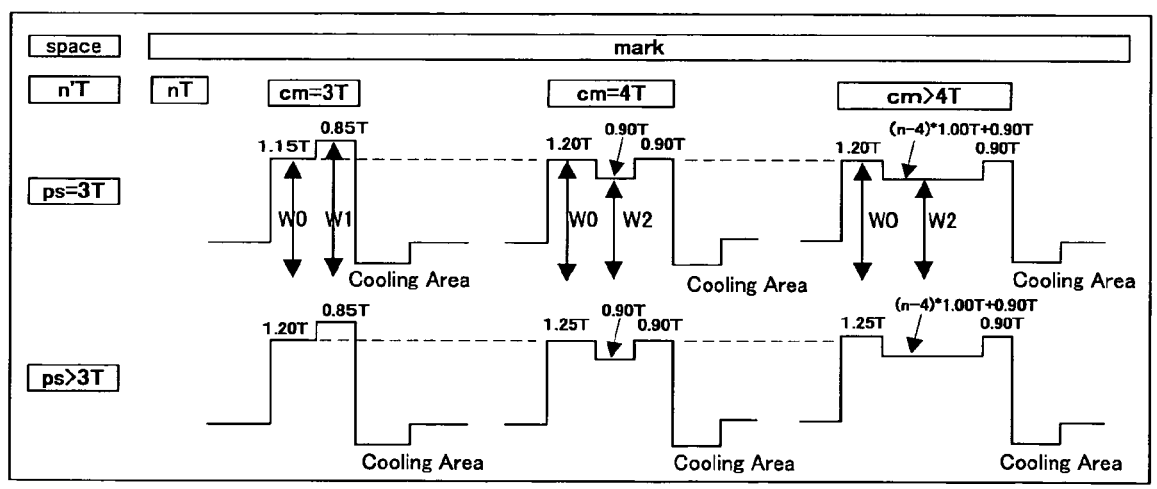
FIG. 7 exemplarily shows power control waveforms corresponding to the second aspect according to the present invention at recording linear velocity of 42 m/sec.
Figure 8:
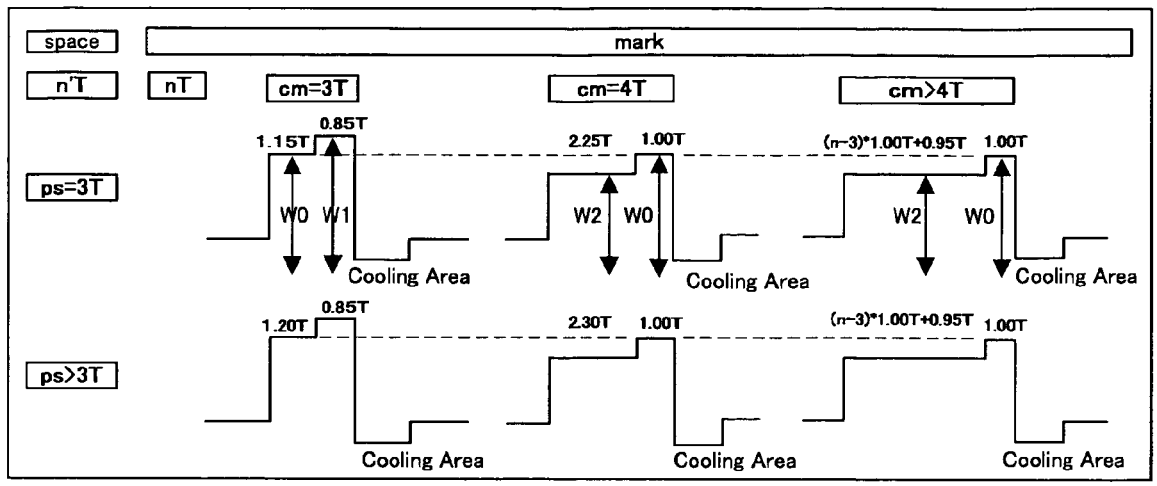
FIG. 8 exemplarily shows power control waveforms corresponding to the second aspect according to the present invention at recording linear velocity of 42 m/sec.
Figure 9:
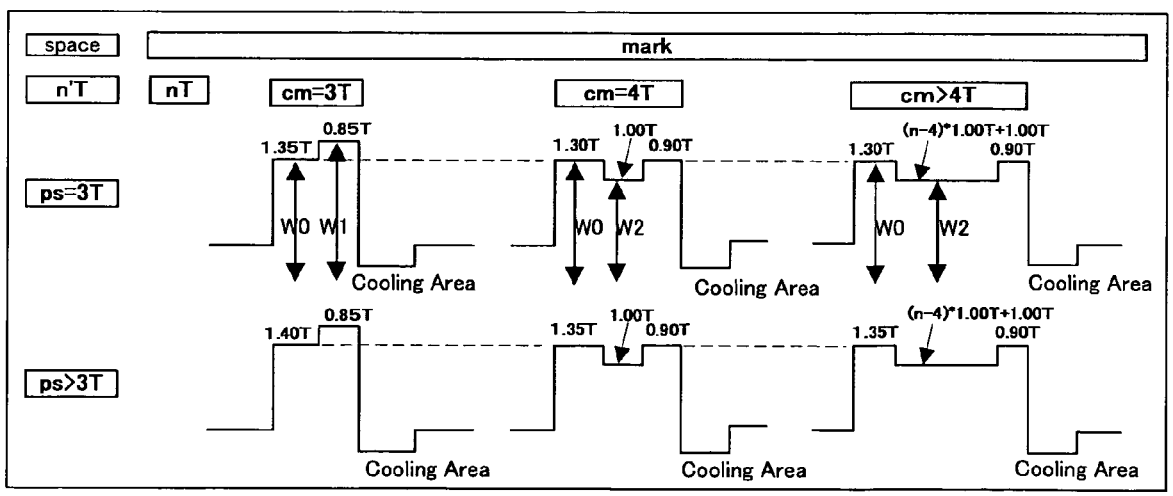
FIG. 9 exemplarily shows power control waveforms corresponding to the second aspect according to the present invention at recording linear velocity of 56 m/sec.
Figure 10:
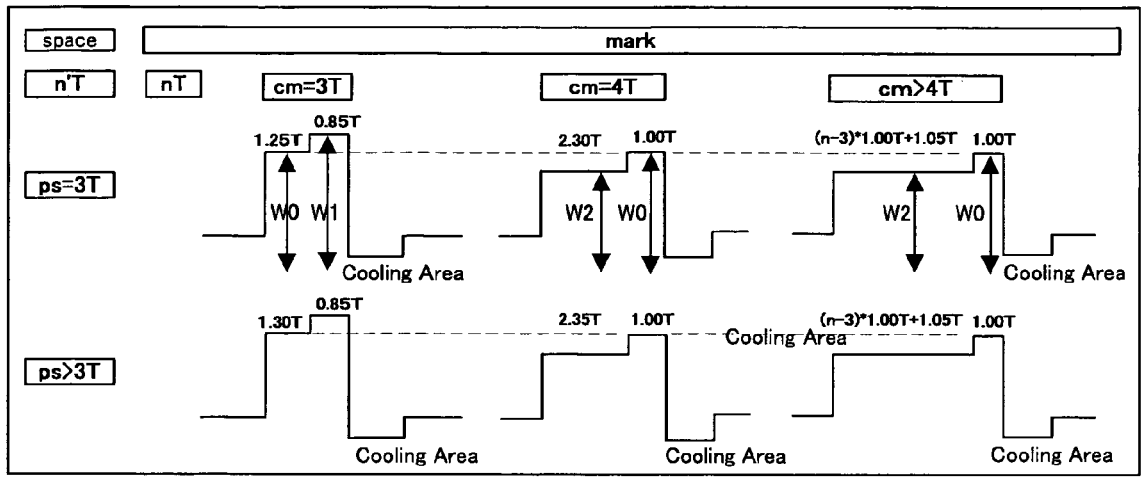
FIG. 10 exemplarily shows power control waveforms corresponding to the second aspect according to the present invention at recording linear velocity of 56 m/sec.

Specifically, FIGS. 7 and 9 show waveforms in which both of the front and rear edges of the shortest mark and still longer marks are energized to the same level of the front edge of the shortest mark. FIGS. 8 and 10 show waveforms in which only the rear edges of the second shortest mark and still longer marks are energized. These waveforms may improve both of asymmetry and jitter.

(Third Aspect)

The apparatuses for recording dye-based recordable DVD media in the third aspect are able to record on a recording layer formed on a substrate at a recording linear velocity of 42 m/sec or more by means of a shortest mark recording unit, second mark recording unit, third mark recording unit, cooling pulse irradiating unit, and the other units selected properly depending on requirements.

The substrate, recording layer, shortest mark recording, cooling pulse irradiating unit, and the other units may be substantially the same as those of the first aspect.

—Mark Recording—

In the mark recording, the second shortest marks are recorded by at least one pulse beam selected from the simple rectangular pulse beam of which the power is lower than the power of the shortest mark at any moments, the pulse beam of which the front edge is energized, and the pulse beam of which the rear end is energized; and the third shortest marks are recorded by one pulse of which the two sites of the front and the rear edges are energized.

The marks are intended for recording data, information, or the like; the marks are desired to be as uniform as possible in order to enhance the recording quality at high linear velocity recording.

The power for the mark recording may be properly selected depending on the application; preferably, $W2/W3$ is 1.05 to 3.00, more preferably is 1.10 to 2.00; wherein the power of the simple rectangular pulse beam is $W3$ of which the power is lower than the power of the shortest mark at any moments, and the power of the pulse of which the two sites of the front and the rear edges are energized is $W3$. Preferably, $W1/W2$ is 1.00 to 2.00, more preferably is 1.05 to 1.50. With respect to the power of the shortest mark, preferably, $W0>W2$ and $W1>W2$; wherein the power of the front edge of the shortest mark is $W0$ and the power of the rear edge of the shortest mark is $W1$.

Figure 11:
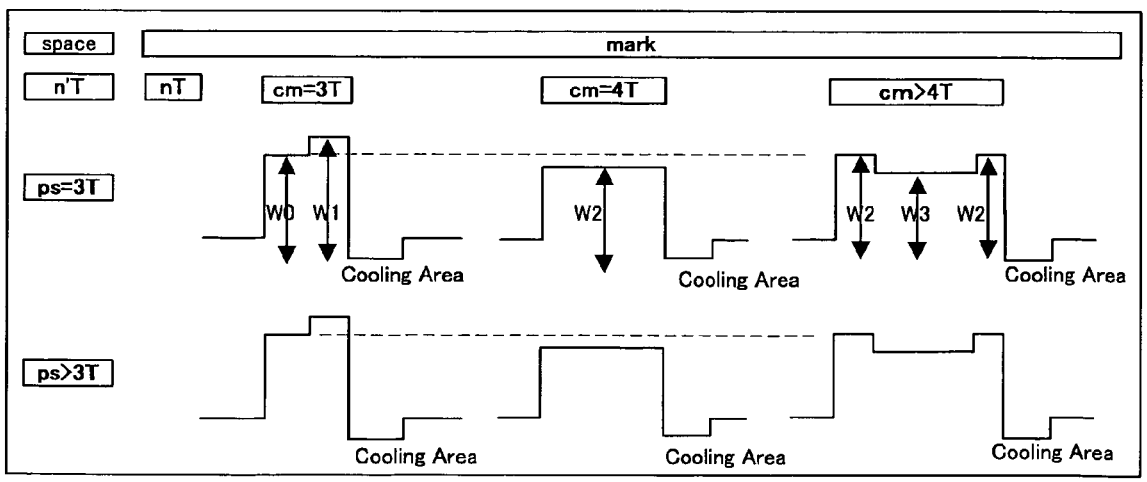
FIG. 11 exemplarily shows power control waveforms corresponding to the third aspect according to the present invention at recording linear velocities of 56 m/sec and 42 m/sec.
Figure 12:
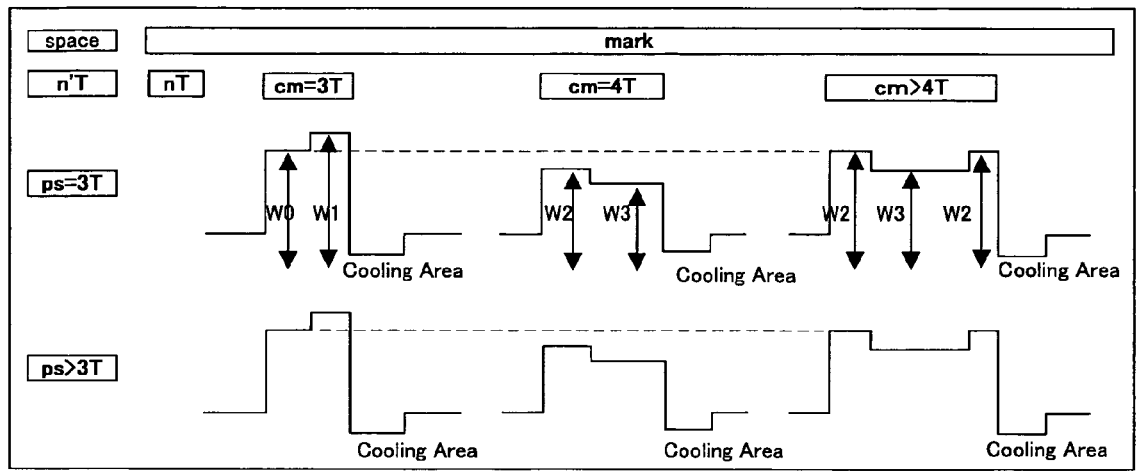
FIG. 12 exemplarily shows power control waveforms corresponding to the third aspect according to the present invention at recording linear velocities of 56 m/sec and 42 m/sec.
Figure 13:
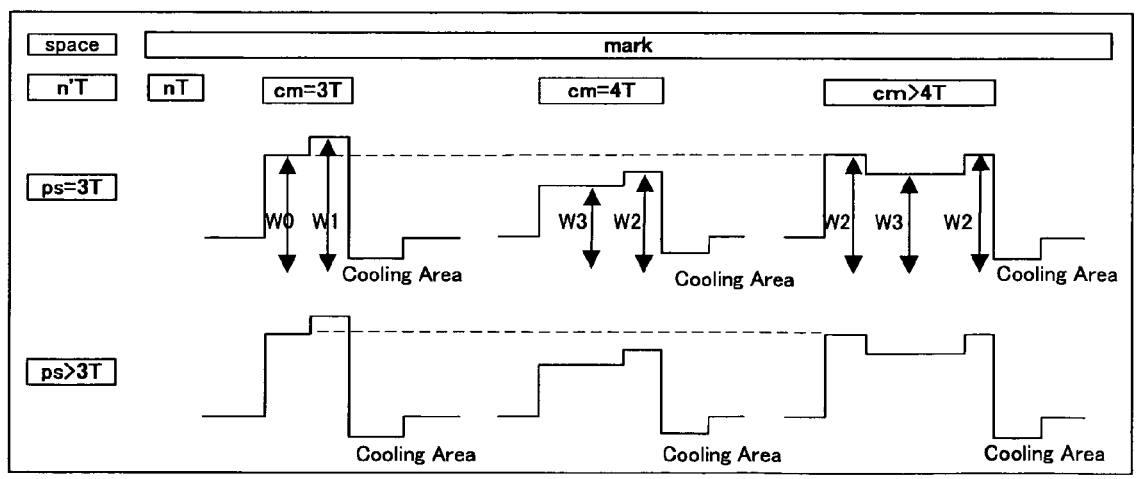
FIG. 13 exemplarily shows power control waveforms corresponding to the third aspect according to the present invention at recording linear velocities of 56 m/sec and 42 m/sec.

Such pulse waveform may lead to proper recording with lower jitter at higher linear velocity recording in particular. FIGS. 11 to 13 exemplarily show recording waveforms corresponding to the second aspect.

Specifically, FIG. 11 shows waveforms of the simple rectangular pulse beam of which the power of the second shortest mark is lower than the power of the shortest mark at any moments, and the two sites of the front and the rear edges of the third shortest mark and still longer marks are energized.

FIG. 12 shows waveforms in which the front edge of the second shortest mark is energized, and the two sites of the front and the rear edges of the third shortest mark and still longer marks are energized.

FIG. 13 shows waveforms in which the rear edge of the second shortest mark is energized, and the two sites of the front and the rear edges of the third shortest mark and still longer marks are energized.

These waveforms may improve both of asymmetry and jitter.

(Fourth Aspect)

The apparatuses for recording dye-based recordable DVD media in the fourth aspect are able to record on a recording layer formed on a substrate at a recording linear velocity of 42 m/sec or more by means of a shortest mark recording unit, second mark recording unit, third mark recording unit, cooling pulse irradiating unit, and the other units selected properly depending on requirements.

The substrate, recording layer, shortest mark recording, cooling pulse irradiating unit, and the other units may be substantially the same as those of the first aspect.

—Mark Recording—

In the mark recording, the second shortest marks are recorded by the simple rectangular pulse beam of which the power is the same as the power of the front edge of the shortest mark, and the third shortest marks and still longer marks are recorded by one pulse beam of which at least the rear end among the respective front and rear ends are energized, and the energized power is the same as the power for recording the front end of the shortest mark.

The marks are intended for recording data, information, or the like; the marks are desired to be as uniform as possible in order to enhance the recording quality at high linear velocity recording.

The power for the mark recording may be properly selected depending on the application; preferably, $W2/W3$ is 1.05 to 3.00, more preferably is 1.10 to 2.00; and preferably, $W1/W2$ is 1.00 to 2.00, more preferably is 1.05 to 1.50; wherein the pulse power of the simple rectangular pulse beam of which the power is the same as the power of the front edge of the shortest mark is $W0$, and the energized power at the front and rear edges is $W0$. In terms of the power of the shortest mark, preferably, $W0>W2$ and $W1>W2$; wherein $W0$ is the power at the front edge of the shortest mark, and $W1$ is the power at the rear edge.

Such pulse waveforms may lead to proper recording with lower jitter at higher linear velocity recording in particular.

FIGS. 14 to 19 exemplarily show recording waveforms corresponding to the fourth aspect.

Figure 14:
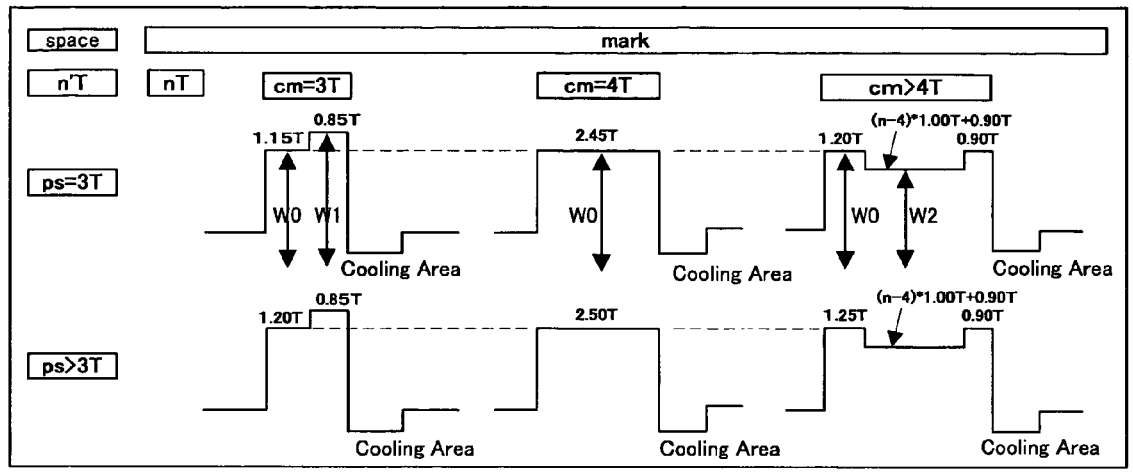
FIG. 14 exemplarily shows power control waveforms corresponding to the fourth aspect according to the present invention at recording linear velocity of 56 m/sec.

Specifically, FIG. 14 shows waveforms of the simple rectangular pulse beam in which the power of the second shortest mark is lower than the power of the shortest mark at any moments, and the two sites of the front and the rear edges of the third shortest mark and still longer marks are energized.

Figure 15:
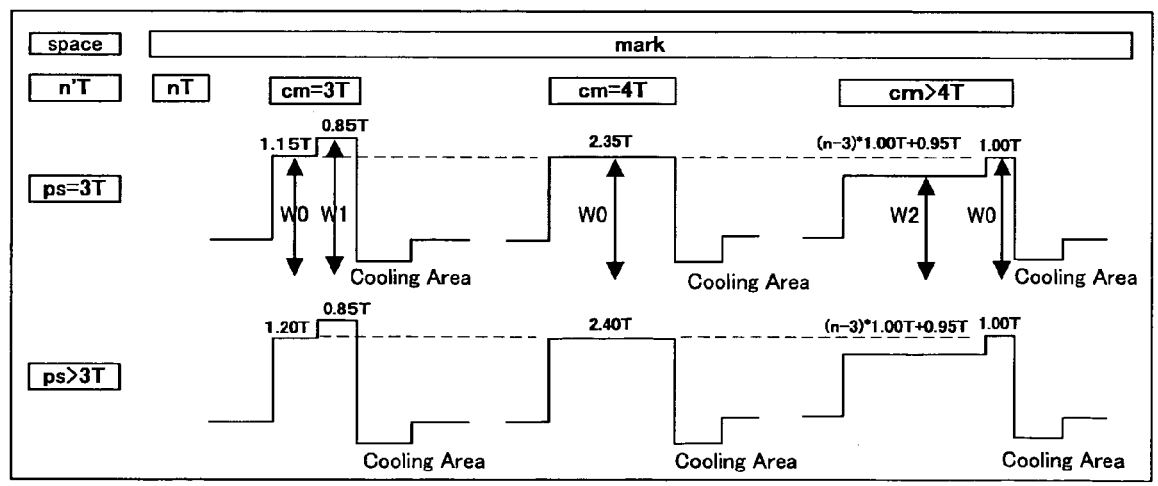
FIG. 15 exemplarily shows power control waveforms corresponding to the fourth aspect according to the present invention at recording linear velocity of 42 m/sec.

FIG. 15 shows waveforms of the simple rectangular pulse beam in which the power of the second shortest mark is lower than the power of the shortest mark at any moments, and only the rear edges of the third shortest mark and still longer marks are energized.

Figure 16:
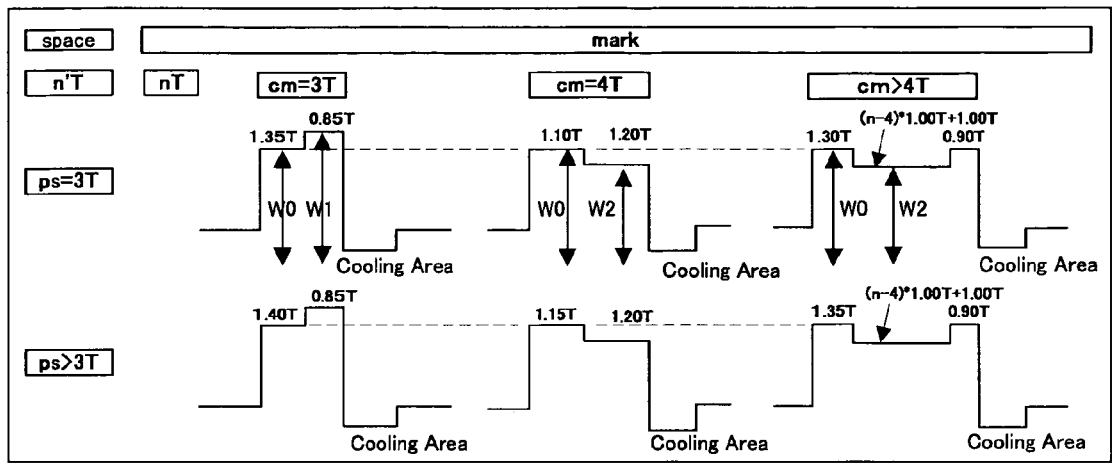
FIG. 16 exemplarily shows power control waveforms corresponding to the fourth aspect according to the present invention at recording linear velocity of 42 m/sec.

FIG. 16 shows waveforms in which the front edge of the second shortest mark is energized, and the two sites of the front and the rear edges of the third shortest mark and still longer marks are energized.

Figure 17:
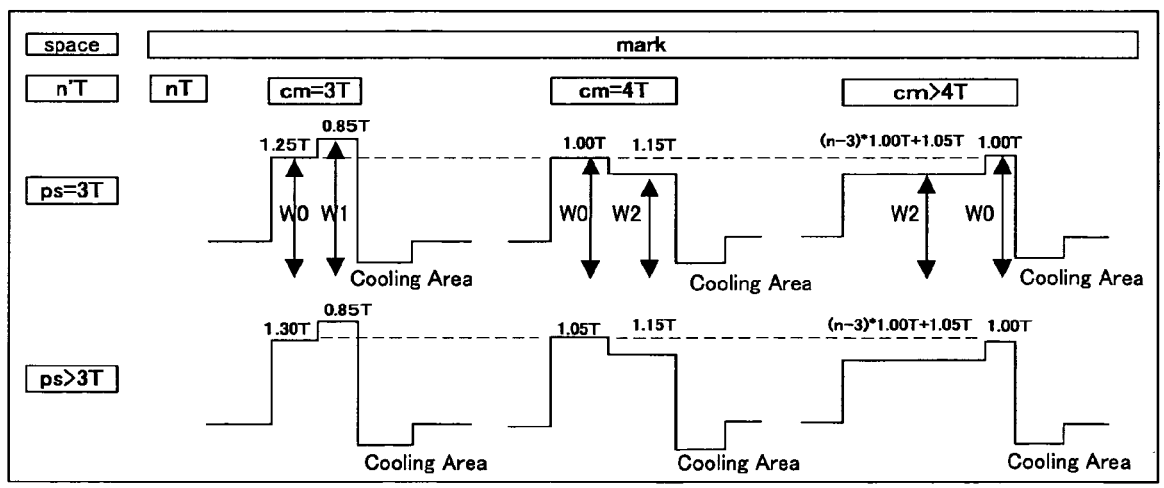
FIG. 17 exemplarily shows power control waveforms corresponding to the fourth aspect according to the present invention at recording linear velocity of 56 m/sec.

FIG. 17 shows waveforms in which the front edge of the second shortest mark is energized, and the rear edge of the third shortest mark and still longer marks are energized.

Figure 18:
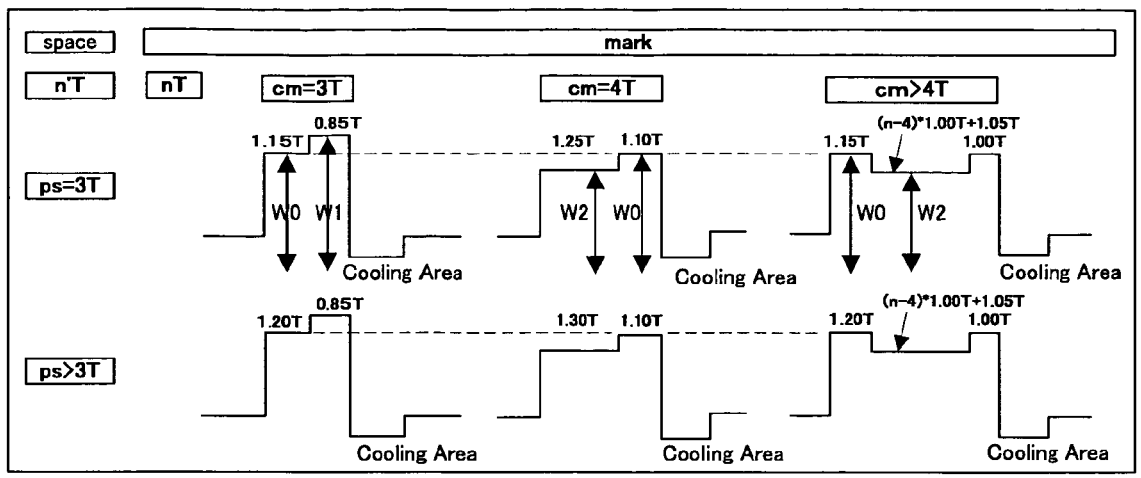
FIG. 18 exemplarily shows power control waveforms corresponding to the fourth aspect according to the present invention at recording linear velocity of 42 m/sec.
Figure 19:
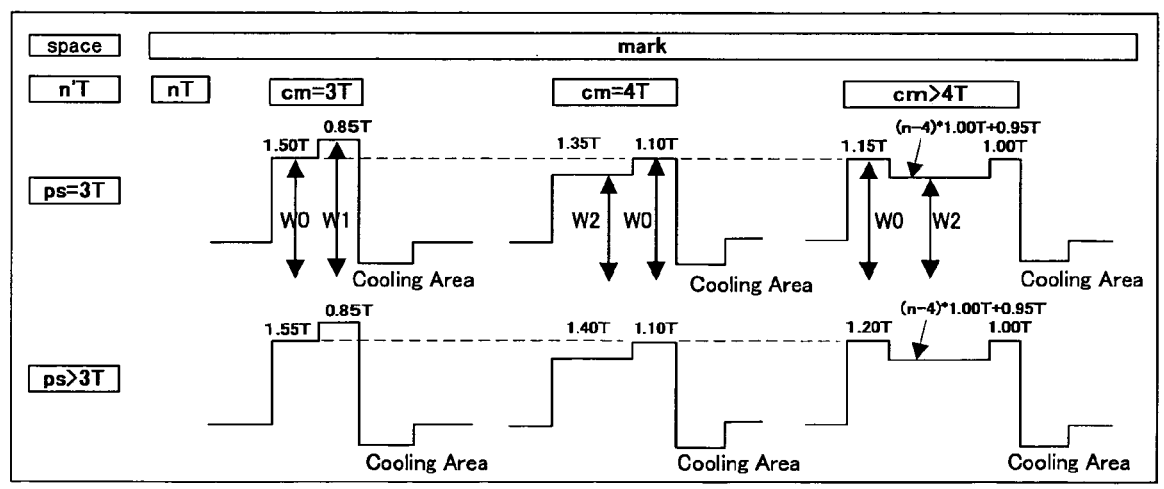
FIG. 19 exemplarily shows power control waveforms corresponding to the fourth aspect according to the present invention at recording linear velocity of 56 m/sec.

FIGS. 18 and 19 show waveforms in which the rear edge of the second shortest mark is energized, and the two sites of the front and the rear edges of the third shortest mark and still longer marks are energized.

—Dye-Based Recordable DVD Media—

The recoding apparatus and recording process according to the present invention may record information in dye-based recordable DVD media, which afford advantages in transporting and storage.

The present invention will be explained with respect to the respective aspects by non-limiting examples and comparative examples.

(First Aspect)

With respect to the first aspect, Examples 1 to 7 and Comparative Examples 1 to 5 are evaluated as follows.

—Preparation of Recordable DVD Media—

—Preparation of Substrate—

A polycarbonate resin was employed as the material of the substrate; the substrate was formed by an injection molding process into a disc in a configuration: 160 angstroms of groove depth, 0.39 μm of half value width, 0.74 μm of truck pitch, 32 T of wobble frequency, 0.6 mm of thickness, and 120 mm of outside diameter.

—Formation of Recording Layer—

The dye compounds (1) and (2) described below were employed as the basic components of the recording layer in a weight ratio of 70/30 as (1)/(2). The dye compounds (1) and (2) were dissolved in a solvent of 2,2,3,3-tetrafluoro-1-propanol to form a solution of the dye compounds.

The substrate described above was fixed to a table of Spinner Stage and was rotated, and the solution of the dye compounds was coated according to a spinner coating process, thereby a recording is layer of organic dye layer of 750 angstroms thick was formed, then was dried at 90° C. for 30 minutes for stabilizing.

—Reflective Layer, Protective Layer, and Protective Substrate—

In addition, Ag reflective layer of 1100 angstroms thick was deposited on the surface of the recording layer by a spattering process, and a protective layer of 5 μm thick of acrylic photopolymer was laminated on the reflective layer, then a flat polycarbonate substrate of 0.6 mm thick and 120 mm diameter prepared by injection molding was adhered using an acrylic photopolymer as a protective substrate, thereby to prepare a recordable DVD medium.

The recordable DVD medium was utilized in the Examples and Comparative Examples of the second to fourth aspects unless indicated otherwise.

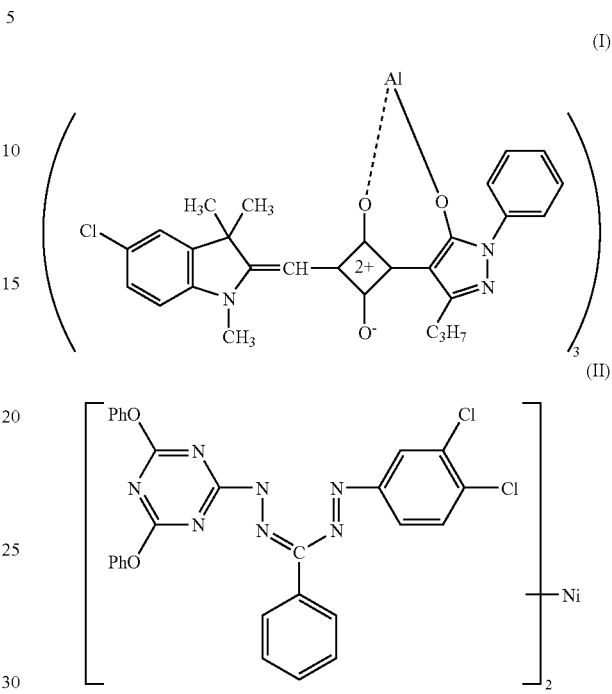

—Recording and Regeneration—

Recording was performed on the resulting recordable DVD medium by a recording/regenerating apparatus by use of a semiconductor laser beam of 660 nm oscillating wavelength and 0.90 μm beam diameter. The recorded signals were EFM signals having a smallest pit length of 0.4 μm and were recorded under the recording conditions and the recording linear velocity shown in Table 2 with a recording power such that the bottom jitter was smallest, then the recording was regenerated and the jitter values, asymmetries, and PI errors were evaluated.

FIG. 6 shows power control waveforms of recording laser beams at recording linear velocities of 56 m/sec and 42 m/sec, wherein the present invention is not limited to the recording linear velocities. FIG. 6 shows waveforms in which rear edge of the shortest mark is energized, the marks other than shortest mark are energized at two sites of the rear edge and front edge.

As shown in FIG. 6 and Table 2, $W0$ is the power at the front edge of the shortest mark, $W1$ is the energized power at the rear edge of the shortest mark, wherein $W2$ is 32 mW or 43 mW, $W1/W0$ is 1.00 to 1.45; $W2$ is the energized or added power of the front and/or rear edge of other than the shortest mark, $W1/W2$ is 1.00 or 1.10; $W3$ is the energized or added power of other than the shortest mark, $W2/W3$ is 1.00 or 1.68.

The cooling powers were adjusted to 0.1 mW and 0 mW respectively in Examples 1 and 2; $W1=W2$ in Example 3; compensations in Table 1 were not conducted in Example 4; recording linear velocity was 42 m/sec in Example 5; the ratio of $W1/W0$ was varied in Examples 6 and 7.

In Comparative Example 1, $W1/W0=1$ at recording linear velocity of 56 m/sec, the optical quantity of cooling portion was 0.7 mW that was the same with the power of regenerating beam, namely, the waveform was the same as that of without a cooling pulse.

In Comparative Example 2, W1/W0=1, the optical quantity of cooling portion was 0.7 mW. In Comparative Example 3, W1/W0=1, cooling pulse was not employed, and the recording linear velocity was changed to 42 m/sec. In Comparative Example 4, the cooling pulse was adjusted to 0.2 mW; in Comparative Example 5, the two sites of the front and rear edges were not energized.

As for the pulse length of power control waveform at 56 m/sec and 42 m/sec shown in FIG. 6, when ps=3 T and cm=3 T: front edge W0=0.75 T, rear edge W1=1.20 T when ps=3 T and cm>3 T: front edge W2=1.20 T, central portion W3=(n−3)T+0.15 T (n: an integer of 4 or more), and rear edge W2=0.60 T when ps>3 T and cm=3 T: front edge W0=0.80 T, rear edge W1=1.20 T when ps>3 T and cm>3 T: front edge W2=1.25 T, central portion W3=(n−3)T+0.15 T (n: an integer of 4 or more), and rear edge W2=0.60 T FIGS. 8 and 10 show waveforms in which and the rear edges of the second shortest mark and still longer marks are energized to the same level as the shortest mark. In these waveforms, both of the asymmetry and the jitter may be improved.

As shown in FIGS. 7 to 10, W0 is the rear edge power of the shortest mark; W1 is the front edge power of the shortest mark and the additional power of the second shortest mark and still longer marks, W1 is 41 mW at a recording linear velocity of 56 m/sec, and is 30 mW at a recording linear velocity of 42 m/sec; W1/W0 is 1.00 to 1.15; W2 is the power of the second shortest mark and still longer marks without additional power, W1/W2 is 1.00 to 1.41.

FIGS. 7 to 10 show power control waveforms of recording laser beams at recording linear velocities of 56 m/sec and 42 m/sec, to which the present invention is not limited.

As for the pulse length of power control waveform at 42 m/sec shown in FIG. 7, when ps=3 T and cm=3 T: front edge W0=1.15 T, rear edge W1=0.85 T

TABLE 2

| | Recording Linear Velocity (m/sec) | Cooling Power at Rear Edge (mW) | Cooling Pulse Length (T) | W1 (mW) | W1/W0 | W1/W2 | W2/W3 | Jitter | Asymmetry | PI error | Compensation shown in Table 1 |
|---|---|---|---|---|---|---|---|---|---|---|---|
| Ex. 1 | 56 | 0.1 | 2.5 | 43 | 1.1 | 1.1 | 1.68 | 8.0 | −0.01 | 10 | Compensated |
| Ex. 2 | 56 | 0 | 2.5 | 43 | 1.1 | 1.1 | 1.68 | 7.9 | 0 | 8 | Compensated |
| Ex. 3 | 56 | 0.1 | 2.5 | 43 | 1.1 | 1.0 | 1.68 | 8.0 | −0.01 | 12 | Compensated |
| Ex. 4 | 56 | 0.1 | 2.5 | 43 | 1.1 | 1.1 | 1.68 | 9.4 | −0.01 | 40 | non |
| Ex. 5 | 42 | 0.1 | 2.5 | 32 | 1.1 | 1.1 | 1.46 | 7.5 | −0.01 | 6 | Compensated |
| Ex. 6 | 56 | 0.1 | 2.5 | 43 | 1.25 | 1.1 | 1.68 | 8.2 | −0.02 | 18 | Compensated |
| Ex. 7 | 56 | 0.1 | 2.5 | 43 | 1.45 | 1.1 | 1.68 | 8.6 | −0.05 | 30 | Compensated |
| Comp. Ex. 1 | 56 | 0.7 | 0 | 43 | 1.0 | 1.1 | 1.68 | 8.7 | −0.09 | 64 | Compensated |
| Comp. Ex. 2 | 56 | 0.1 | 2.5 | 43 | 1.0 | 1.1 | 1.60 | 8.1 | −0.04 | 38 | Compensated |
| Comp. Ex. 3 | 42 | 0.7 | 0 | 32 | 1.0 | 1.1 | 1.46 | 8.3 | −0.08 | 48 | Compensated |
| Comp. Ex. 4 | 56 | 0.2 | 2.5 | 43 | 1.1 | 1.1 | 1.68 | 8.1 | −0.03 | 26 | Compensated |
| Comp. Ex. 5 | 56 | 0.1 | 2.5 | 43 | 1.1 | 1.1 | 1.00 | 10.6 | −0.10 | 110 | Compensated |

The results of Table 2 demonstrate that Examples 1 to 7 are superior to Comparative Examples 1 to 5 in jitter and asymmetry properties and remarkably superior to in terms of PI error.

(Second Aspect)

With respect to the second aspect, Examples 1 to 9 and Comparative Examples 1 to 13 are evaluated as follows.

—Recording and Regeneration—

Recording was performed on the recordable DVD medium described above by use of a semiconductor laser beam of 660 nm oscillating wavelength and 0.90 µm beam diameter. The recorded signals were EFM signals having a smallest pit length of 0.4 µm and were recorded under the recording conditions and the recording linear velocity shown in Table 3 with a recording power such that the bottom jitter was smallest while tracking, then the recording was regenerated and the jitter values, asymmetries, and PI errors were evaluated.

The power control waveforms of the semiconductor laser beam are shown in FIGS. 7 to 10; the relations between Examples and Comparative Examples are shown in Tables 3 and 4.

FIGS. 7 and 9 show waveforms in which both of the front and the rear edges of the second shortest mark and still longer marks are energized to the same level as the shortest mark.

when ps=3 T and cm=4 T: front edge W0=1.20 T, central portion W2=0.90 T and rear edge W0=0.90 T when ps=3 T and cm>4 T: front edge W0=1.20 T, central portion W2=(n−4)×1.00 T+0.90 T (n: an integer of 4 or more), and rear edge W0=0.90 T when ps>3 T and cm=3 T: front edge W0=1.20 T, rear edge W1=0.85 T when ps>3 T and cm=4 T: front edge W0=1.25 T, central portion W2=0.90 T and rear edge W0=0.90 T when ps>3 T and cm>4 T: front edge W0=1.25 T, central portion W2=(n−4)×1.00 T+0.90 T (n: an integer of 3 or more), and rear edge W0=0.90 T As for the pulse length of power control waveform at 42 m/sec shown in FIG. 8, when ps=3 T and cm=3 T: front edge W0=1.15 T, rear edge W1=0.85 T when ps=3 T and cm=4 T: front edge W2=2.25 T, rear edge W0=1.00 T when ps=3 T and cm>4 T: front edge W2=(n−3)×1.00 T+0.95 T (n: an integer of 3 or more), and rear edge W0=1.00 T when ps>3 T and cm=3 T: front edge W0=1.20 T, rear edge W1=0.85 T when ps>3 T and cm=4 T: front edge W0=2.30 T, W0=1.00 T when ps>3 T and cm>4 T: front edge W2=(n−3)×1.00 T+0.95 T (n: an integer of 3 or more), and rear edge W0=1.00 T As for the pulse length of power control waveform at 56 m/sec shown in FIG. 9, when ps=3 T and cm=3 T: front edge W0=1.35 T, rear edge W1=0.85 T when ps=3 T and cm=4 T: front edge W0=1.30 T, central portion W2=1.00 T, and rear edge W0=0.90 T when ps=3 T and cm>4 T: front edge W0=1.30 T, central portion W2=(n−4)×1.00 T+1.00 T (n: an integer of 3 or more), and rear edge W0=0.90 T when ps>3 T and cm=3 T: front edge W0=1.40 T, rear edge W1=0.85 T when ps>3 T and cm=4 T: front edge W0=1.35 T, central portion W2=1.00 T, and rear edge W0=0.90 T cooling portion was 0.7 mW, which is the same as the regeneration optical power, thus corresponding to the recording waveform without the cooling pulse. In Comparative Example 2, the optical quantity of the cooling portion was 0.3 mW, which is larger than the upper limit of the present invention. In Comparative Example 3, the recording waveform was changed without cooling pulse similarly as Comparative Example 1.

The recording pulse W0 of 3 T and the recording pulse W0 of 4 T or more are different each other in Comparative Examples 9 and 10, in Comparative Example 9:

$$W0(3\ T)=1.05\times W0(\geq 4\ T)$$

in Comparative Example 10:

$$W0(3\ T)=0.95\times W0(>4\ T)$$

TABLE 3

| | Recording Linear Velocity (m/sec) | Control Waveform | Cooling Power at Rear Edge (mW) | Cooling Pulse Length (T) | W1 (mW) | W1/W0 | W1/W2 | Jitter | Asymmetry | PI error | Compensation shown in Table 1 |
|---|---|---|---|---|---|---|---|---|---|---|---|
| Ex. 1 | 42 | FIG. 7 | 0 | 1.0 | 30 | 1.05 | 1.38 | 8.0 | −0.01 | 7 | Compensated |
| Ex. 2 | 42 | FIG. 7 | 0 | 1.5 | 30 | 1.10 | 1.36 | 9.2 | 0 | 24 | non |
| Ex. 3 | 42 | FIG. 8 | 0.1 | 0.8 | 30 | 1.15 | 1.39 | 7.3 | −0.02 | 8 | Compensated |
| Ex. 4 | 42 | FIG. 8 | 0 | 2.0 | 30 | 1.08 | 1.41 | 7.4 | 0.01 | 6 | Compensated |
| Ex. 5 | 56 | FIG. 9 | 0 | 2.0 | 42 | 1.04 | 1.33 | 7.6 | −0.01 | 4 | Compensated |
| Ex. 6 | 56 | FIG. 9 | 0.1 | 2.5 | 42 | 1.06 | 1.30 | 7.5 | 0 | 1 | Compensated |
| Ex. 7 | 56 | FIG.10 | 0 | 2.0 | 42 | 1.04 | 1.35 | 7.7 | −0.01 | 8 | Compensated |
| Ex. 8 | 56 | FIG.10 | 0 | 0.4 | 42 | 1.20 | 1.36 | 8.4 | −0.05 | 19 | Compensated |
| Comp. Ex. 1 | 56 | FIG. 9 | 0.7 | 0.0 | 42 | 1.04 | 1.33 | 7.9 | −0.1 | 56 | Compensated |
| Comp. Ex. 2 | 56 | FIG. 9 | 0.3 | 0.5 | 42 | 1.04 | 1.33 | 8.4 | −0.05 | 41 | Compensated |
| Comp. Ex. 3 | 56 | FIG.10 | 0.7 | 0.0 | 42 | 1.04 | 1.35 | 8.4 | −0.08 | 68 | Compensated |
| Comp. Ex. 4 | 42 | FIG. 7 | 0.2 | 1.0 | 30 | 1.05 | 1.38 | 8.2 | −0.05 | 47 | Compensated |
| Comp. Ex. 5 | 56 | FIG. 9 | 0.2 | 1.5 | 42 | 1.10 | 1.36 | 8.3 | −0.07 | 64 | Compensated |
| Comp. Ex. 6 | 42 | FIG. 8 | 0.2 | 0.8 | 30 | 1.15 | 1.39 | 7.9 | −0.05 | 38 | Compensated |
| Comp. Ex. 7 | 56 | FIG.10 | 0.2 | 2.0 | 42 | 1.08 | 1.41 | 8.4 | −0.06 | 63 | Compensated |
| Comp. Ex. 8 | 56 | FIG. 9 | 0 | 0.5 | 42 | 1.00 | 1.33 | 8.7 | −0.03 | 49 | Compensated |
| Comp. Ex. 9 | 56 | FIG. 9 | 0.1 | 2.5 | 42 | 1.06 | 1.30 | 8.6 | 0 | 66 | Compensated |
| Comp. Ex. 10 | 42 | FIG. 8 | 0 | 2.0 | 30 | 1.08 | 1.41 | 8.5 | 0 | 57 | Compensated |
| Comp. Ex. 11 | 42 | FIG. 7 | 0 | 1.0 | 30 | 1.05 | 1.00 | 8.1 | −0.11 | 67 | Compensated | when ps>3 T and cm>4 T: front edge W0=1.35 T, central portion W2=(n−4)×1.00 T+1.00 T (n: an integer of 3 or more), and rear edge W0=0.90 T As for the pulse length of power control waveform at 56 m/sec shown in FIG. 10, when ps=3 T and cm=3 T: front edge W0=1.25 T, rear edge W1=0.85 T when ps=3 T and cm=4 T: front edge W2=2.30 T, rear edge W0=1.00 T when ps=3 T and cm>4 T: front edge W2=(n−3)×1.00 T+1.05 T (n: an integer of 3 or more), and rear edge W0=1.00 T when ps>3 T and cm=3 T: front edge W0=1.30 T, rear edge W1=0.85 T when ps>3 T and cm=4 T: front edge W0=2.35 T, rear edge W0=1.00 T when ps>3 T and cm>4 T: front edge W2=(n−3)×1.00 T+1.05 T (n: an integer of 3 or more), and rear edge W0=1.00 T The present invention is not limited to the pulse length shown in FIGS. 7 to 10.

In Example 8, the cooling pulse length was 0.4 T, which is shorter than 3 T×1/6=0.5 T; 3 T is the length of the shortest space. In Comparative Example 1, the optical quantity of the The results of Table 3 demonstrate that Examples 1 to 8 are superior to Comparative Examples 1 to 11 in jitter and asymmetry properties and remarkably superior to in terms of PI error.

Further, in Example 9, recording was performed on the recordable DVD medium described above by use of a semiconductor laser beam of 660 nm oscillating wavelength and 0.90 μm beam diameter. The recorded signals were EFM signals having a smallest pit length of 0.4 μm and were recorded under the recording conditions and the recording linear velocity shown in Table 4 and also under the condition of compensation of Table 1 with a recording power such that the bottom jitter was smallest while tracking, then the recording was regenerated and the jitter values, asymmetries, and PI errors were evaluated.

In comparative Examples 12 and 13, using a molded substrate and a test stamper in which the size of LPPb of LPP format conducted in DVD-R was changed, a recordable DVD medium was prepared in the similar condition to Examples, and evaluations were carried out similarly to Examples. The results are shown in Table 4.

TABLE 4

| | Recording Linear Velocity (m/sec) | Control Waveform | Cooling Power at Rear Edge (mW) | Cooling Pulse Length (T) | W1 (mW) | W1/W0 | W1/W2 | Jitter | Asymmetry | PI error | LPPb Value |
|---|---|---|---|---|---|---|---|---|---|---|---|
| Ex. 9 | 42 | FIG. 7 | 0 | 1.5 | 30 | 1.04 | 1.37 | 7.9 | −0.01 | 5 | non |
| Comp. Ex. 12 | 42 | FIG. 7 | 0 | 1.5 | 30 | 1.04 | 1.37 | 7.7 | −0.01 | 11 | 0.1 |
| Comp. Ex. 13 | 42 | FIG. 7 | 0 | 1.5 | 30 | 1.04 | 1.37 | 7.8 | −0.01 | 47 | 0.24 |

The results of Table 4 demonstrate that larger LPPb results in increase of PI error even when the jitter property is proper in the samples of LPP format. Further, it is confirmed that when LPP is less than 0.16 as Comparative Example 12, the address detection comes to impossible in actual apparatuses.

(Third Aspect)

With respect to the third aspect, Examples 1 to 9 and Comparative Examples 1 to 5 are evaluated as follows.

—Recording and Regeneration—

Recording was performed on the recordable DVD medium described above by use of a semiconductor laser beam of 660 nm oscillating wavelength and 0.90 μm beam diameter. The recorded signals were EFM signals having a smallest pit length of 0.4 μm and were recorded under the recording conditions and the recording linear velocity shown in Table 5 with a recording power such that the bottom jitter was smallest while tracking, then the recording was regenerated and the jitter values, asymmetries, and PI errors were evaluated.

The power control waveforms of the semiconductor laser beam are shown in FIGS. 11 to 13; the relations between Examples and Comparative Examples are shown in Table 5.

FIG. 11 shows waveforms of the simple rectangular pulse beam of which the power of the second shortest mark is lower than the power of the shortest mark at any moments, and the two sites of the front and the rear edges of the third shortest mark and still longer marks are energized.

FIG. 12 shows waveforms in which the front edge of the second shortest mark is energized, and the two sites of the front and the rear edges of the third shortest mark and still longer marks are energized.

FIG. 13 shows waveforms in which the rear edge of the second shortest mark is energized, and the two sites of the front and the rear edges of the third shortest mark and still longer marks are energized.

These waveforms may improve both of asymmetry and jitter.

As shown in FIGS. 11 to 13, W0 is the front edge power of the shortest mark; W1 is the rear edge power of the shortest mark, and is 31 mW or 42 mW; W1/W0 is 1.00 to 1.45; W2 is the power of the second shortest mark and still longer marks having an additional power, and W1/W2 is 1 or 1.1; W3 is the power of the second shortest mark and still longer marks without an additional power, and W2/W3 is 1 to 1.68.

The recording linear velocity was of 56 m/sec or 42 m/sec in FIGS. 11 to 13, to which the present invention is not limited.

As for the pulse length of power control waveforms at recording linear velocity of 56 m/sec or 42 m/sec shown in FIG. 11,
when ps=3 T and cm=3 T: front edge W0=0.75 T, rear edge W1=1.20 T
when ps=3 T and cm=4 T: W2=2.60 T
when ps=3 T and cm>4 T: front edge W0=1.15 T, central portion W2=(n−4)×1.00 T+0.20 T (n: an integer of 3 or more), and rear edge W0=0.60 T
when ps>3 T and cm=3 T: front edge W0=0.80 T, rear edge W1=1.20 T
when ps>3 T and cm=4 T: W0=2.60 T
when ps>3 T and cm>4 T: front edge W0=1.20 T, central portion W2=(n−4)×1.00 T+0.20 T (n: an integer of 3 or more), and rear edge W0=0.60 T As for the pulse length of power control waveforms at recording linear velocity of 42 m/sec shown in FIG. 12,
when ps=3 T and cm=3 T: front edge W0=1.15 T, rear edge W1=0.85 T
when ps=3 T and cm=4 T: front edge W2=2.25 T, rear edge W1=1.00 T
when ps=3 T and cm>4 T: front edge W2=(n−3)×1.00 T+0.95 T (n: an integer of 3 or more), and rear edge W0=1.00 T
when ps>3 T and cm=3 T: front edge W0=1.20 T, rear edge W1=0.85 T
when ps>3 T and cm=4 T: front edge W0=2.30 T, rear edge W1=1.00 T
when ps>3 T and cm>4 T: front edge W2=(n−3)×1.00 T+0.95 T (n: an integer of 3 or more), and rear edge W0=1.00 T As for the pulse length of power control waveforms at recording linear velocity of 56 m/sec shown in FIG. 13,
when ps=3 T and cm=3 T: front edge W0=1.35 T, rear edge W1=0.85 T
when ps=3 T and cm=4 T: front edge W0=1.30 T, central portion W2=1.00 T, and rear edge W0=0.90 T
when ps=3 T and cm>4 T: front edge W0=1.30 T, central portion W2=(n−4)×1.00 T+1.00 T (n: an integer of 3 or more), and rear edge W0=0.90 T
when ps>3 T and cm=3 T: front edge W0=1.40 T, rear edge W1=0.85 T
when ps>3 T and cm=4 T: front edge W0=1.35 T, central portion W2=1.00 T, and rear edge W0=0.90 T
when ps>3 T and cm>4 T: front edge W0=1.35 T, central portion W2=(n−4)×1.00 T+0.20 T (n: an integer of 3 or more), and rear edge W0=0.90 T The cooling power was adjusted to 0.1 mW, 0 mW in Examples 1 and 2; W1=W2 in Example 3; the compensation of Table 1 was not carried out in Example 4; the linear velocity was 42 m/sec in Example 5; the ratio of W1/W0 was varied in Examples 6 and 7. In Examples 8 and 9, recording was conducted by use of 4 T pulse shown in FIGS. 12 and 13.

In Comparative Example 1, W1/W0=1 at recording linear velocity of 56 m/sec, the optical quantity of cooling portion was 0.7 mW which was the same with the power of regenerating beam, namely, the waveform was the same as that of without a cooling pulse.

In Comparative Example 2, W1/W0=1, the optical quantity of cooling portion was 0.1 mW. In Comparative Example 3, W1/W0=1, cooling pulse was not employed, and the recording linear velocity was changed to 42 m/sec. In Comparative Example 4, the cooling pulse was adjusted to 0.2 mW; in Comparative Example 5, the two sites of the front and rear edges were not energized.

FIG. 17 shows waveforms in which the front edge of the second shortest mark is energized, and the rear edges of the third shortest mark and still longer marks are energized.

FIGS. 18 and 19 show waveforms in which the rear edge of the second shortest mark is energized, and two sites of the front and the rear edges of the third shortest mark and still longer marks are energized.

TABLE 5

|  | Recording Linear Velocity (m/sec) | Control Waveform | Cooling Power at Rear Edge (mW) | Cooling Pulse Length (T) | W1 (mW) | W1/W0 | W1/W2 | W2/W3 | Jitter | Asymmetry | PI error | Compensation shown in Table 1 |
|---|---|---|---|---|---|---|---|---|---|---|---|---|
| Ex. 1 | 56 | FIG. 11 | 0.1 | 2.5 | 42 | 1.1 | 1.1 | 1.65 | 8.1 | −0.02 | 10 | Compensated |
| Ex. 2 | 56 | FIG. 11 | 0.0 | 2.5 | 42 | 1.1 | 1.1 | 1.65 | 7.9 | −0.01 | 8 | Compensated |
| Ex. 3 | 56 | FIG. 11 | 0.1 | 2.5 | 42 | 1.1 | 1.0 | 1.65 | 8.1 | −0.02 | 12 | Compensated |
| Ex. 4 | 56 | FIG. 11 | 0.1 | 2.5 | 42 | 1.1 | 1.1 | 1.65 | 9.5 | −0.02 | 40 | non |
| Ex. 5 | 42 | FIG. 11 | 0.1 | 2.5 | 31 | 1.1 | 1.1 | 1.57 | 7.4 | −0.02 | 6 | Compensated |
| Ex. 6 | 56 | FIG. 11 | 0.1 | 2.5 | 42 | 1.25 | 1.1 | 1.65 | 8.2 | −0.03 | 18 | Compensated |
| Ex. 7 | 56 | FIG. 11 | 0.1 | 2.5 | 42 | 1.45 | 1.1 | 1.65 | 8.6 | −0.06 | 30 | Compensated |
| Ex. 8 | 56 | FIG. 12 | 0.1 | 2.5 | 42 | 1.1 | 1.1 | 1.67 | 7.9 | −0.02 | 8 | Compensated |
| Ex. 9 | 56 | FIG. 13 | 0.1 | 2.5 | 42 | 1.1 | 1.1 | 1.68 | 7.9 | −0.01 | 9 | Compensated |
| Comp. Ex. 1 | 56 | FIG. 11 | 0.7 | 0.0 | 42 | 1.0 | 1.1 | 1.65 | 8.6 | −0.10 | 64 | Compensated |
| Comp. Ex. 2 | 56 | FIG. 11 | 0.1 | 2.5 | 42 | 1.0 | 1.1 | 1.65 | 8.3 | −0.05 | 38 | Compensated |
| Comp. Ex. 3 | 42 | FIG. 11 | 0.7 | 0.0 | 31 | 1.0 | 1.1 | 1.57 | 8.4 | −0.09 | 48 | Compensated |
| Comp. Ex. 4 | 56 | FIG. 11 | 0.2 | 2.5 | 42 | 1.1 | 1.1 | 1.65 | 8.5 | −0.07 | 44 | Compensated |
| Comp. Ex. 5 | 56 | FIG. 11 | 0.1 | 2.5 | 42 | 1.1 | 1.1 | 1.00 | 10.2 | −0.05 | 133 | Compensated |

The results of Table 5 demonstrate that Examples 1 to 9 are superior to Comparative Examples 1 to 5 in jitter and asymmetry properties and remarkably superior to in terms of PI error.

(Fourth Aspect)

With respect to the fourth aspect, Examples 1 to 9 and Comparative Examples 1 to 13 are evaluated as follows.

—Recording and Regeneration—

Recording was performed on the recordable DVD medium described above by use of a semiconductor laser beam of 660 nm oscillating wavelength and 0.90 μm beam diameter. The recorded signals were EFM signals having a smallest pit length of 0.4 μm and were recorded under the recording conditions and the recording linear velocity shown in Table 6 with a recording power such that the bottom jitter was smallest while tracking, then the recording was regenerated and the jitter values, asymmetries, and PI errors were evaluated.

The power control waveforms of the semiconductor laser beam are shown in FIGS. 14 to 19; the relations between Examples and Comparative Examples are shown in Tables 6 and 7.

FIG. 14 shows waveforms of the simple rectangular pulse beam of which the power of the second shortest mark is lower than the power of the shortest mark at any moments, and the two sites of the front and the rear edges of the third shortest mark and still longer marks are energized.

FIG. 15 shows waveforms of the simple rectangular pulse beam of which the power of the second shortest mark is lower than the power of the shortest mark at any moments, and the rear edges of the third shortest mark and still longer marks are energized.

FIG. 16 shows waveforms in which the front edge of the second shortest mark is energized, and both of the front and the rear edges of the third shortest mark and still longer marks are energized.

These waveforms may improve both of asymmetry and jitter.

As shown in FIGS. 14 to 19, W0 is one of the front edge power of the shortest mark, the power of second shortest mark of simple rectangular pulse, energized power at the front or rear edge of the second shortest mark, and energized power of the third shortest mark and still longer marks; the W0 is 43 mW; W1 is the rear end power of the shortest mark, and W1/W0 is 1.00 to 1.08; W2 is the power of the second shortest and still longer marks without an additional power, and W1/W2 is 1.00 to 1.42.

The recording linear velocity is of 56 m/sec or 42 m/sec in FIGS. 14 to 19, to which the present invention is not limited.

As for the pulse length of power control waveforms at recording linear velocity of 56 m/sec shown in FIG. 14, when ps=3 T and cm=3 T: front edge W0=1.15 T, rear edge W1=0.85 T when ps=3 T and cm=4 T: W0=2.45 T when ps=3 T and cm>4 T: front edge W0=1.20 T, central portion W2=(n−4)×1.00 T+0.90 T (n: an integer of 3 or more), and rear edge W0=0.90 T when ps>3 T and cm=3 T: front edge W0=1.20 T, rear edge W1=0.85 T when ps>3 T and cm=4 T: W0=2.50 T when ps>3 T and cm>4 T: front edge W0=1.25 T, central portion W2=(n−4)×1.00 T+0.90 T (n: an integer of 3 or more), and rear edge W0=0.90 T As for the pulse length of power control waveforms at recording linear velocity of 42 m/sec shown in FIG. 15, when ps=3 T and cm=3 T: front edge W0=1.15 T, rear edge W1=0.85 T when ps=3 T and cm=4 T: W0=2.35 T when ps=3 T and cm>4 T: front edge W2=(n−3)×1.00 T+0.95 T (n: an integer of 3 or more), and rear edge W0=1.00 T when ps>3 T and cm=3 T: front edge W0=1.20 T, rear edge W1=0.85 T when ps>3 T and cm=4 T: W0=2.40 T when ps>3 T and cm>4 T: front edge W2=(n−3)×1.00 T+0.95 T (n: an integer of 3 or more), and rear edge W0=1.00 T As for the pulse length of power control waveforms at recording linear velocity of 42 m/sec shown in FIG. 16,
when ps=3 T and cm=3 T: front edge W0=1.35 T, rear edge W1=0.85 T
when ps=3 T and cm=4 T: front edge W0=1.10 T, rear edge W2=1.20 T
when ps=3 T and cm>4 T: front edge W0=1.30 T, central portion W2=(n−4)×1.00 T+1.00 T (n: an integer of 3 or more), and rear edge W0=0.90 T
when ps>3 T and cm=3 T: front edge W0=1.40 T, rear edge W1=0.85 T
when ps>3 T and cm=4 T: front edge W0=1.15 T, rear edge W2=1.20 T
when ps>3 T and cm>4 T: front edge W0=1.35 T, central portion W2=(n−4)×1.00 T+1.00 T (n: an integer of 3 or more), and rear edge W0=0.90 T As for the pulse length of power control waveforms at recording linear velocity of 56 m/sec shown in FIG. 17,
when ps=3 T and cm=3 T: front edge W0=1.25 T, rear edge W1=0.85 T
when ps=3 T and cm=4 T: front edge W0=1.00 T, rear edge W2=1.15 T
when ps=3 T and cm>4 T: front edge W2=(n−3)×1.00 T+1.05 T (n: an integer of 3 or more), and rear edge W0=1.00 T
when ps>3 T and cm=3 T: front edge W0=1.30 T, rear edge W1=0.85 T
when ps>3 T and cm=4 T: front edge W0=1.05 T, rear edge W2=1.15 T
when ps>3 T and cm>4 T: front edge W2=(n−3)×1.00 T+1.05 T (n: an integer of 3 or more), and rear edge W0=1.00 T As for the pulse length of power control waveforms at recording linear velocity of 42 m/sec shown in FIG. 18,
when ps=3 T and cm=3 T: front edge W0=1.15 T, rear edge W1=0.85 T
when ps=3 T and cm=4 T: front edge W2=1.25 T, rear edge W0=1.10 T
when ps=3 T and cm>4 T: front edge W0=1.15 T, central portion W2=(n−4)×1.00 T+1.05 T (n: an integer of 3 or more), and rear edge W0=1.00 T
when ps>3 T and cm=3 T: front edge W0=1.20 T, rear edge W1=0.85 T
when ps>3 T and cm=4 T: front edge W2=1.30 T, rear edge W0=1.10 T
when ps>3 T and cm>4 T: front edge W0=1.20 T, central portion W2=(n−4)×1.00 T+1.05 T (n: an integer of 3 or more), and rear edge W0=1.00 T As for the pulse length of power control waveforms at recording linear velocity of 42 m/sec shown in FIG. 19,
when ps=3 T and cm=3 T: front edge W0=1.50 T, rear edge W1=0.85 T
when ps=3 T and cm=4 T: front edge W2=1.35 T, rear edge W0=1.10 T
when ps=3 T and cm>4 T: front edge W0=1.15 T, central portion W2=(n−4)×1.00 T+0.95 T (n: an integer of 3 or more), and rear edge W0=1.00 T
when ps>3 T and cm=3 T: front edge W0=1.55 T, rear edge W1=0.85 T
when ps>3 T and cm=4 T: front edge W2=1.40 T, rear edge W0=1.10 T
when ps>3 T and cm>4 T: front edge W0=1.20 T, central portion W2=(n−4)×1.00 T+0.95 T (n: an integer of 3 or more), and rear edge W0=1.00 T The pulse lengths were those of FIGS. 14 to 19, to which the present invention is not limited.

In Example 8, the cooling pulse length was 0.4 T, which is shorter than 3 T×1/6=0.5 T; 3 T is the length of the shortest space. In Comparative Example 1, the optical quantity of the cooling portion was 0.7 mW, which is the same as the regeneration optical power, thus corresponding to the recording waveform without the cooling pulse. In Comparative Example 2, the optical quantity of the cooling portion was 0.3 mW, which is larger than the upper limit of the present invention. In Comparative Example 3, the recording waveform was changed without cooling pulse similarly as Comparative Example 1.

The recording pulse W0 of 3 T and the recording pulse W0 of 4 T or more are different each other in Comparative Examples 9 and 10,
in Comparative Example 9:

$$W0(3\ T) = 1.05 \times W0(\geq 4\ T)$$

in Comparative Example 10:

$$W0(3\ T) = 0.95 \times W0(\geq 4\ T)$$

TABLE 6

| | Recording Linear Velocity (m/sec) | Control Waveform | Cooling Power at Rear Edge (mW) | Cooling Pulse Length (T) | W1 (mW) | W1/W0 | W1/W2 | Jitter | Asymmetry | PI error | Compensation shown in Table 1 |
|---|---|---|---|---|---|---|---|---|---|---|---|
| Ex. 1 | 56 | FIG. 14 | 0 | 1.0 | 43 | 1.05 | 1.32 | 8.0 | −0.01 | 5 | Compensated |
| Ex. 2 | 56 | FIG. 14 | 0 | 1.5 | 43 | 1.10 | 1.30 | 9.4 | 0 | 21 | non |
| Ex. 3 | 42 | FIG. 15 | 0.1 | 0.8 | 31 | 1.15 | 1.39 | 7.8 | −0.02 | 7 | Compensated |
| Ex. 4 | 42 | FIG. 16 | 0 | 2.0 | 31 | 1.08 | 1.42 | 7.7 | 0.01 | 6 | Compensated |
| Ex. 5 | 56 | FIG. 17 | 0 | 2.0 | 43 | 1.04 | 1.29 | 7.6 | −0.01 | 7 | Compensated |
| Ex. 6 | 56 | FIG. 18 | 0.1 | 2.5 | 43 | 1.06 | 1.33 | 7.8 | 0 | 1 | Compensated |
| Ex. 7 | 42 | FIG. 18 | 0 | 2.0 | 31 | 1.10 | 1.30 | 7.7 | −0.01 | 8 | Compensated |
| Ex. 8 | 56 | FIG. 19 | 0 | 0.4 | 43 | 1.20 | 1.37 | 8.4 | −0.05 | 20 | Compensated |
| Comp. Ex. 1 | 56 | FIG. 14 | 0.7 | 0.0 | 43 | 1.06 | 1.33 | 7.8 | −0.10 | 51 | Compensated |
| Comp. Ex. 2 | 56 | FIG. 14 | 0.3 | 0.5 | 43 | 1.06 | 1.33 | 8.3 | −0.05 | 37 | Compensated |
| Comp. Ex. 3 | 42 | FIG. 16 | 0.7 | 0.0 | 31 | 1.08 | 1.38 | 8.4 | −0.08 | 63 | Compensated |
| Comp. Ex. 4 | 42 | FIG. 15 | 0.2 | 1.0 | 31 | 1.15 | 1.39 | 8.1 | −0.05 | 37 | Compensated |
| Comp. Ex. 5 | 56 | FIG. 17 | 0.2 | 1.5 | 43 | 1.04 | 1.29 | 8.2 | −0.07 | 70 | Compensated |
| Comp. Ex. 6 | 42 | FIG. 15 | 0.2 | 0.8 | 31 | 1.15 | 1.39 | 7.9 | −0.06 | 46 | Compensated |
| Comp. Ex. 7 | 56 | FIG. 17 | 0.2 | 2.0 | 43 | 1.08 | 1.32 | 8.4 | −0.09 | 68 | Compensated |
| Comp. Ex. 8 | 42 | FIG. 18 | 0 | 2.0 | 31 | 1.00 | 1.30 | 8.6 | −0.02 | 54 | Compensated |
| Comp. Ex. 9 | 42 | FIG. 18 | 0 | 2.0 | 31 | 1.10 | 1.30 | 8.5 | −0.01 | 38 | Compensated |
| Comp. Ex. 10 | 56 | FIG. 14 | 0 | 1.0 | 43 | 1.05 | 1.32 | 8.7 | −0.01 | 42 | Compensated |
| Comp. Ex. 11 | 56 | FIG. 14 | 0 | 1.0 | 43 | 1.05 | 1.00 | 8.2 | −0.10 | 68 | Compensated |

The results of Table 6 demonstrate that Examples 1 to 8 are superior to Comparative Examples 1 to 11 in jitter and asymmetry properties and remarkably superior to in terms of PI error.

Further, in Example 9, recording was performed on the recordable DVD medium described above by use of a semiconductor laser beam of 660 nm oscillating wavelength and 0.90 μm beam diameter. The recorded signals were EFM signals having a smallest pit length of 0.4 μm and were recorded under the recording conditions and the recording linear velocity shown in Table 7 and also under the condition of compensation of Table 1 with a recording power such that the bottom jitter was smallest while tracking, then the recording was regenerated and the jitter values, asymmetries, and PI errors were evaluated.

In comparative Examples 12 and 13, using a molded substrate and a test stamper in which the size of LPPb of LPP format conducted in DVD-R was changed, a recordable DVD medium was prepared in the similar condition to Examples, and evaluations were carried out similarly to Examples.

TABLE 7

| | Recording Linear Velocity (m/sec) | Control Waveform | Cooling Power at Rear Edge (mW) | Cooling Pulse Length (T) | W1 (mW) | W1/W0 | W1/W2 | Jitter | Asymmetry | PI error | LPPb Value |
|---|---|---|---|---|---|---|---|---|---|---|---|
| EX. 9 | 56 | FIG.19 | 0 | 1.5 | 42 | 1.04 | 1.3 | 7.8 | −0.01 | 7 | non |
| Comp. Ex. 12 | 56 | FIG.19 | 0 | 1.5 | 42 | 1.04 | 1.3 | 7.7 | −0.01 | 11 | 0.1 |
| Comp. Ex. 13 | 56 | FIG.19 | 0 | 1.5 | 42 | 1.04 | 1.3 | 7.7 | −0.01 | 50 | 0.24 |

The results of Table 7 demonstrate that larger LPPb results in increase of PI error even when the jitter property is proper in the samples of LPP format. Further, it is confirmed that when LPP is less than 0.16 as Comparative Example 12, the address detection comes to impossible in actual apparatuses.

The apparatuses and processes for recording dye-based recordable DVD media according to the present invention provide new formats with recordable DVD systems that utilize semiconductor lasers having shorter oscillating wavelength compared to CD media, which feature may represent an effective way to eliminate unrecorded regions at additional data portions similarly to LPP system, and also may present an advantage that data errors are hardly induced due to precise control of fine cut width at preparing stampers and/or LPP signal leaks into data portion, accordingly the apparatuses and processes according to the present invention may satisfactorily applied to dye-based recordable DVD recording media and the like.

What is claimed is:

1. An apparatus for recording a dye-based recordable DVD medium comprising a unit which records shortest marks and second marks other than the shortest marks,
    wherein the dye-based recordable DVD medium comprises a substrate and a recording layer formed on the substrate, the substrate comprises a guide groove to which wobble is formed, and the recording layer comprises at least an organic dye,
    wherein the shortest marks are recorded by use of one pulse beam of which the rear edge is more energized than the front edge,
    wherein the second marks are recorded by use of one pulse beam of which the two sites of front and rear edges are energized to a power that is less than or equal to the power of the rear edge of the shortest mark, and wherein the power for each of the front and rear edges of each second mark is substantially the same,
    wherein the respective pulse beams include a cooling pulse at the back edge of the respective pulse beams at 0.1 mW/pulse or less of optical energy,
    wherein the recording of marks is performed on the recording layer at a recording linear velocity of 42 m/sec or more, and
    wherein heating pulse width at front edge of a mark, of which just before the space is the shortest, is distinguished depending on whether the mark is the shortest or not, and the heating pulse width at the front edge of the shortest mark is determined to be longer than the heating pulse width at the front edge of other than the shortest mark; and the heating pulse width at the front edge of the shortest mark is distinguished depending on whether the space just before the mark is the shortest or not, and the heating pulse width at the front edge of the mark, of which just before the space is the shortest, is determined to be shorter than the heating pulse width at the front edge of the mark of which just before the space is not the shortest.

2. The apparatus for recording a dye-based recordable DVD medium according to claim 1, wherein the duration of the cooling pulse at the back edge of the respective pulse beams is 1/6 to 6/6 of the duration of the shortest space.

3. The apparatus for recording a dye-based recordable DVD medium according to claim 1, wherein the wobble frequency is in a range of 4 T to 96 T (T: basic clock cycle).

4. The apparatus for recording a dye-based recordable DVD medium according to claim 1, wherein synchronization is performed under a condition of $0.1 \leq Wo/PP \leq 0.4$ (Wo: wobble amplitude, PP: push-pull amplitude i.e. differential signal by a 2-divided optical detector for detecting and controlling track errors).

5. The apparatus for recording a dye-based recordable DVD medium according to claim 1, wherein the wavelength of the recording pulse beam is 600 nm to 720 nm.

6. The apparatus for recording a dye-based recordable DVD medium according to claim 1, wherein the refractive index "n" and the extinction coefficient "k" of the recording layer are $1.5 \leq n \leq 3.0$ and $0.02 \leq k \leq 0.2$, in a condition that the wavelength of the measured light is L±5 nm (L: the wavelength of pulse beam for recording and reproducing).

7. The apparatus for recording a dye-based recordable DVD medium according to claim 1, wherein the initial decomposition temperature of the recording layer is 100° C. to 360° C.

8. The apparatus for recording a dye-based recordable DVD medium according to claim 1, wherein the dye-based recordable DVD medium is provided with at least one layer selected from the group consisting of a reflective layer, protective layer, adhesive layer, protective substrate, and hardcoat layer on the substrate surface, other than the recording layer.

9. The apparatus for recording a dye-based recordable DVD medium according to claim 8, wherein the reflective layer is formed from at least one of Au, Ag, and Al, or formed from an alloy selected from those containing at least one of Au, Ag, and Al.

10. The apparatus for recording a dye-based recordable DVD medium according to claim 8, wherein the protective layer is formed of a UV curable resin.

11. The apparatus for recording a dye-based recordable DVD medium according to claim 8, wherein the adhesive layer is provided between two substrates, at least one of the two substrates comprises a guide groove to which wobble is formed, and the adhesive of the adhesive layer is a UV curable resin.

12. A process for recording a dye-based recordable DVD medium comprising:
    recording shortest marks,
    recording second marks, and
    irradiating cooling pulses,
    wherein the dye-based recordable DVD medium comprises a substrate and a recording layer formed on the substrate, the substrate comprises a guide groove to which wobble is formed, and the recording layer comprises at least an organic dye,
    wherein the recording shortest marks performs to record each of the shortest marks by use of one pulse beam of which the rear edge is more energized than the front edge,
    wherein the recording second marks performs to record each of the marks other than the shortest marks by use of one pulse beam of which the two sites of front and rear edges are energized to a power that is less than or equal to the power of the rear edge of the shortest mark, and wherein the power for each of the front and rear edges of each second mark is substantially the same,
    wherein the respective pulse beams include a cooling pulse at the back edge at 0.1 mW/pulse or less of optical energy,
    wherein the recording is performed on the recording layer at a recording linear velocity of 42 m/sec or more, and
    wherein heating pulse width at front edge of a mark, of which just before the space is the shortest, is distinguished depending on whether the mark is the shortest or not, and the heating pulse width at the front edge of the shortest mark is determined to be longer than the heating pulse width at the front edge of other than the shortest mark; and the heating pulse width at the front edge of the shortest mark is distinguished depending on whether the space just before the mark is the shortest or not, and the heating pulse width at the front edge of the mark, of which just before the space is the shortest, is determined to be shorter than the heating pulse width at the front edge of the mark of which just before the space is not the shortest.

13. The process for recording a dye-based recordable DVD medium according to claim 12, wherein the duration of the cooling pulse at the back edge of the respective pulse beams is 1/6 to 6/6 of the duration of the shortest space.

14. The process for recording a dye-based recordable DVD medium according to claim 12, wherein the wobble frequency is in a range of 4 T to 96 T (T: basic clock cycle).

15. The process for recording a dye-based recordable DVD medium according to claim 12, wherein synchronization is performed under a condition of $0.1 \leq Wo/PP \leq 0.4$ (Wo: wobble amplitude, PP: push-pull amplitude i.e. differential signal by a 2-divided optical detector for detecting and controlling track errors).

16. The process for recording a dye-based recordable DVD medium according to claim 12, wherein the wavelength of the recording pulse beam is 600 nm to 720 nm.

17. The process for recording a dye-based recordable DVD medium according to claim 12, wherein the refractive index "n" and the extinction coefficient "k" of the recording layer are $1.5 \leq n \leq 3.0$ and $0.02 \leq k \leq 0.2$ in a condition that the wavelength of the measured light is L±5 nm (L: the wavelength of pulse beam for recording and reproducing).

18. The process for recording a dye-based recordable DVD medium according to claim 12, wherein the initial decomposition temperature of the recording layer is 100° C. to 360° C.

19. The process for recording a dye-based recordable DVD medium according to claim 12, wherein the dye-based recordable DVD medium is provided with at least one layer selected from the group consisting of a reflective layer, protective layer, adhesive layer, protective substrate, and hardcoat layer on the substrate surface, other than the recording layer.

20. The process for recording a dye-based recordable DVD medium according to claim 19, wherein the reflective layer is formed from at least one of Au, Ag, and Al, or formed from an alloy selected from those containing at least one of Au, Ag, and Al.

21. The process for recording a dye-based recordable DVD medium according to claim 19, wherein the protective layer is formed of a UV curable resin.

22. The process for recording a dye-based recordable DVD medium according to claim 19, wherein the adhesive layer is provided between two substrates, at least one of the two substrates comprises a guide groove to which wobble is formed, and the adhesive of the adhesive layer is a UV curable resin.

* * * * *

UNITED STATES PATENT AND TRADEMARK OFFICE
CERTIFICATE OF CORRECTION

| | | |
|---|---|---|
| PATENT NO. | : 7,646,692 B2 | Page 1 of 1 |
| APPLICATION NO. | : 11/074070 | |
| DATED | : January 12, 2010 | |
| INVENTOR(S) | : Ishimi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1345 days.

Signed and Sealed this

Sixteenth Day of November, 2010

David J. Kappos
*Director of the United States Patent and Trademark Office*